United States Patent
Hirano et al.

(10) Patent No.: US 12,298,596 B2
(45) Date of Patent: May 13, 2025

(54) OPTICAL SYSTEM AND PROJECTOR

(71) Applicant: SEIKO EPSON CORPORATION, Tokyo (JP)

(72) Inventors: Hitoshi Hirano, Suwa (JP); Yasuyuki Kiyama, Suwa (JP); Koji Shiokawa, Suzaka (JP); Yuta Ito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 444 days.

(21) Appl. No.: 17/880,185

(22) Filed: Aug. 3, 2022

(65) Prior Publication Data

US 2023/0054195 A1 Feb. 23, 2023

(30) Foreign Application Priority Data

Aug. 3, 2021 (JP) ................. 2021-127323

(51) Int. Cl.
*G02B 9/62* (2006.01)

(52) U.S. Cl.
CPC ..................... *G02B 9/62* (2013.01)

(58) Field of Classification Search
CPC . G02B 9/62; G02B 9/60; G02B 13/16; G02B 13/22; G02B 13/0045; G02B 13/02; G02B 15/14; G02B 15/145523; G02B 15/146; G02B 17/54; H01J 2237/04928
USPC ........................................................ 359/696
See application file for complete search history.

(56) References Cited

U.S. PATENT DOCUMENTS

| 7,830,620 | B2 | 11/2010 | Asami | |
|---|---|---|---|---|
| 2005/0200968 | A1* | 9/2005 | Nose | G02B 15/177 359/680 |
| 2010/0053774 | A1* | 3/2010 | Baba | G02B 13/16 359/755 |

FOREIGN PATENT DOCUMENTS

| JP | 2010-091697 A | 4/2010 |
|---|---|---|
| JP | 2015-075627 A | 4/2015 |
| JP | 2015-111192 A | 6/2015 |

* cited by examiner

*Primary Examiner* — Travis S Fissel
(74) *Attorney, Agent, or Firm* — Oliff PLC

(57) ABSTRACT

An optical system includes a first lens having negative refractive power, a stop, a second lens having positive refractive power, an aperture stop, a third lens having positive refractive power, a fourth lens having negative refractive power, a fifth lens having positive refractive power, and a sixth lens having positive refractive power, with the lenses sequentially arranged from the magnifying side toward the demagnifying side. The third and fourth lenses are bonded into a doublet, which has negative refractive power. One of the fifth and sixth lenses is made of plastic and has aspherical surfaces on opposite sides, and the other is made of glass. The portion on the demagnifying side of the sixth lens is a telecentric portion. Conditional Expression (1) below is satisfied, $$SD12/SD2 < 0.9 \quad (1)$$

where SD12 represents the effective radius of the stop, and SD2 represents the effective radius of the second lens.

9 Claims, 18 Drawing Sheets

OPTICAL SYSTEM AND PROJECTOR

The present application is based on, and claims priority from JP Application Serial Number 2021-127323, filed Aug. 3, 2021, the disclosure of which is hereby incorporated by reference herein in its entirety.

BACKGROUND

1. Technical Field

The present disclosure relates to an optical system and a projector.

2. Related Art

JP-A-2010-91697 describes an optical system including six lenses. The optical system described in JP-A-2010-91697 includes a first lens that has a concave surface facing the image side and has negative power, a second lens that is a biconvex lens and has positive power, a third lens having positive power, a stop, a fourth lens, which is biconcave lens and has negative power, a fifth lens, which has a convex surface facing the image side and has positive power, and a sixth lens, which has a convex surface facing the object side and has positive power, with the first to sixth lenses arranged sequentially from the demagnifying side. The optical system disclosed in JP-A-2010-91697 has an f-number of 2.00.

Optical systems each formed of six lenses are required to have higher brightness.

SUMMARY

To achieve the object described above, an optical system according to an aspect of the present disclosure includes a first lens having negative refractive power, a stop, a second lens having positive refractive power, an aperture stop, a third lens having positive refractive power, a fourth lens having negative refractive power, a fifth lens having positive refractive power, and a sixth lens having positive refractive power with the first to sixth lenses sequentially arranged from a magnifying side toward a demagnifying side. The third lens and the fourth lens are bonded to each other into a doublet. The doublet has negative refractive power. One of the fifth lens and the sixth lens is made of plastic and has aspherical surfaces on opposite sides, and another of the fifth lens and the sixth lens is made of glass. A portion on the demagnifying side of the sixth lens is a telecentric portion. Conditional Expression (1) below is satisfied, $$SD12/SD2 < 0.9 \quad (1)$$

where SD12 represents an effective radius of the stop, and SD2 represents an effective radius of the second lens.

A projector according to another aspect of the present disclosure includes the optical system described above and an image formation unit that forms a projection image in a demagnifying-side conjugate plane of the optical system.

DESCRIPTION OF EXEMPLARY EMBODIMENTS

An optical system and a projector according to an embodiment of the present disclosure will be described below with reference to the drawings.

Projector

Figure 1:
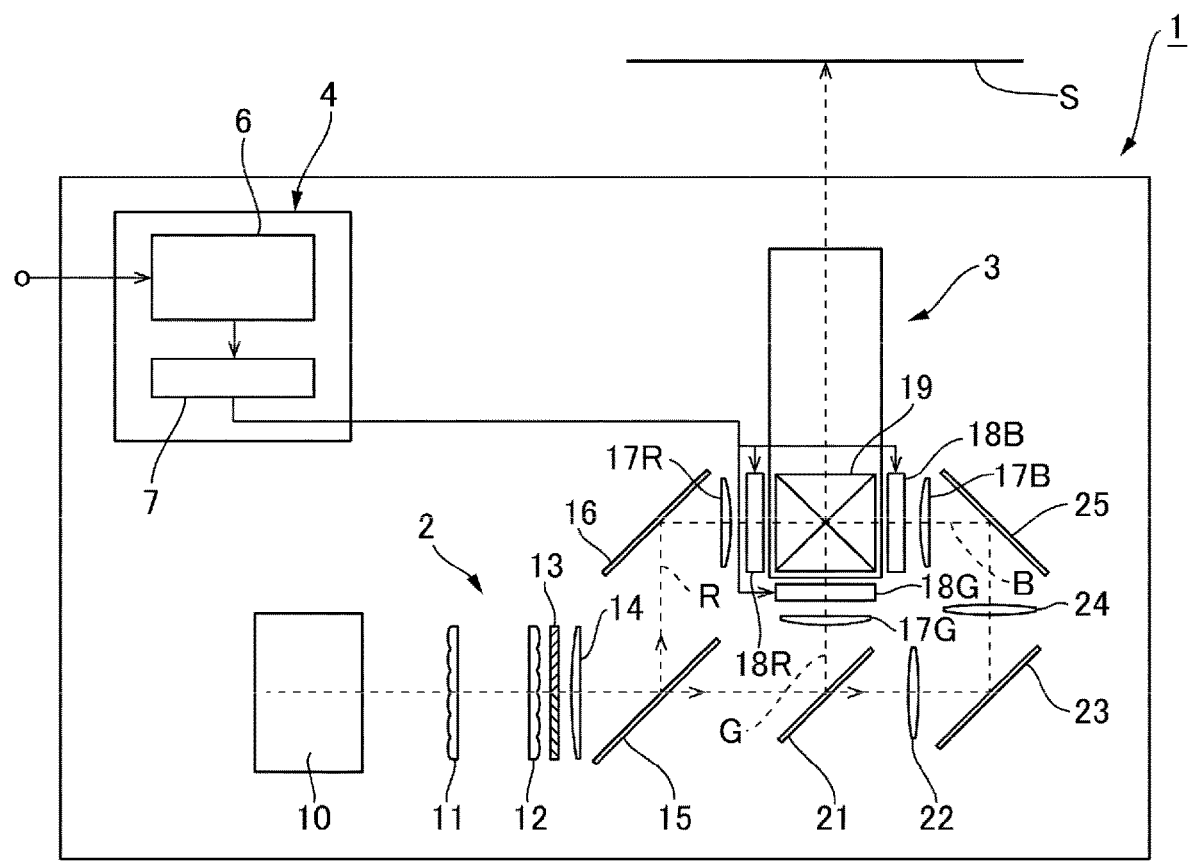
FIG. 1 shows a schematic configuration of a projector including an optical system according to an embodiment of the present disclosure.

FIG. 1 shows a schematic configuration of a projector including an optical system 3 according to the embodiment of the present disclosure. A projector 1 includes an image formation unit 2, which generates a projection image to be projected onto a screen S, the optical system 3, which magnifies the projection image and projects the magnified projection image onto the screen S, and a control unit 4, which controls the operation of the image formation unit 2, as shown in FIG. 1.

Image Formation Unit and Control Unit

The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light from the second optical integration lens 12 into predetermined linearly polarized light. The superimposing lens 14 superimposes images of the lens elements of the first optical integration lens 11 on one another on a display area of each of liquid crystal panels 18R, 18G, and 18B, which will be described later, via the second optical integration lens 12.

The image formation unit 2 includes a first dichroic mirror 15, a reflection mirror 16, a field lens 17R, and the liquid crystal panel 18R. The first dichroic mirror 15 reflects R light, which is part of the beam incident from the superimposing lens 14, and transmits G light and B light, which are part of the beam incident from the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beam from the first dichroic mirror 15, and transmits the B light, which is part of the beam from the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround the cross dichroic prism 19 so as to face three sides of the cross dichroic prism 19. The cross dichroic prism 19 is a prism for light combination and produces a projection image that is the combination of the light modulated by the liquid crystal panel 18R, the light modulated by the liquid crystal panel 18G, and the light modulated by the liquid crystal panel 18B.

The optical system 3 magnifies the combined projection image from the cross dichroic prism 19 and projects the magnified projection image onto the screen S.

The control unit 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of a color corresponding to the converted image signal. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Optical System

Figure 2:
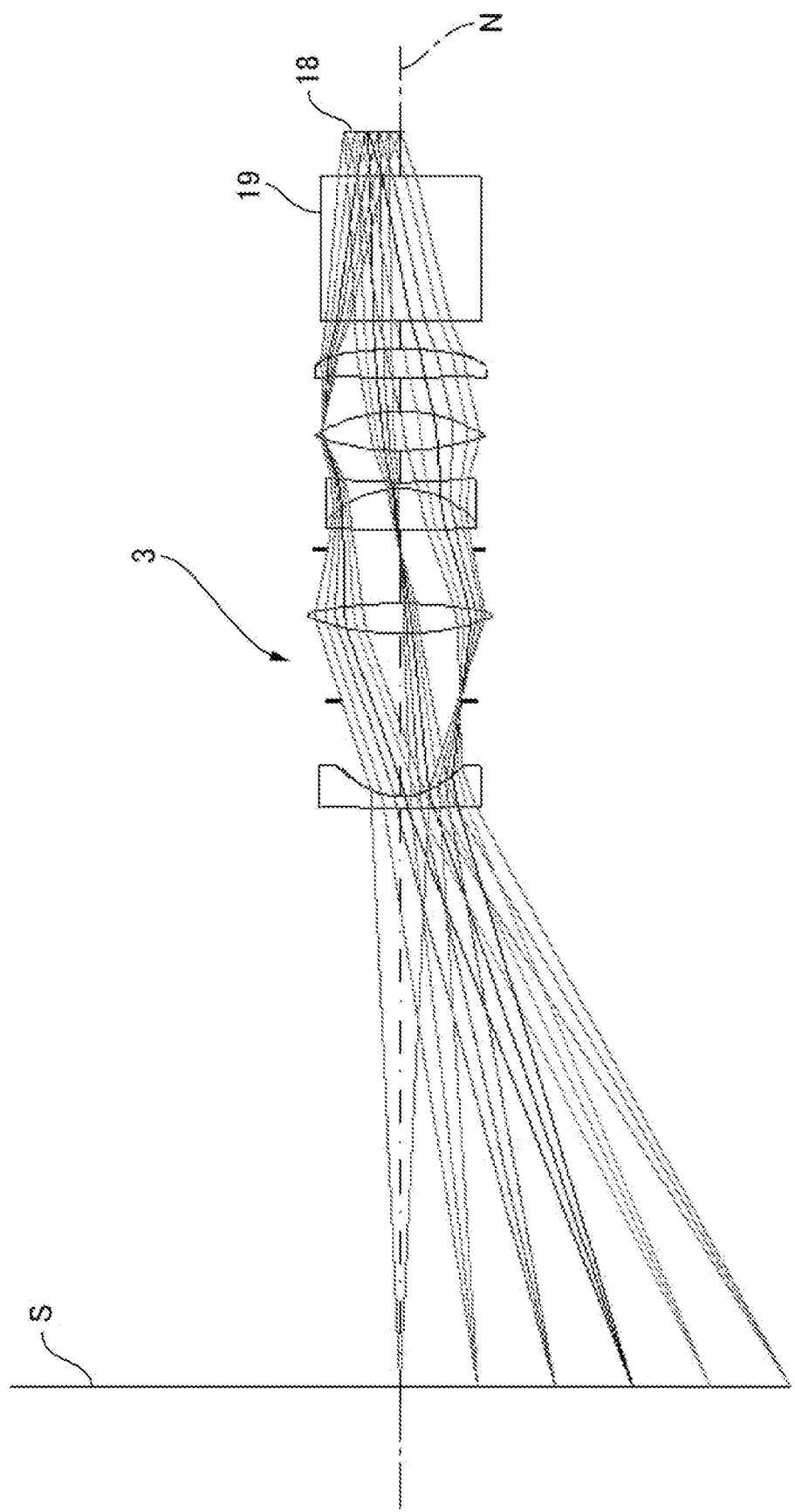
FIG. 2 is a beam diagram showing beams traveling in the optical system.

The optical system 3 will next be described. FIG. 2 is a beam diagram showing beams traveling in the optical system 3. In FIG. 2, the liquid crystal panels 18R, 18G, and 18B are drawn as a liquid crystal panel 18. The screen S is disposed in the magnifying-side conjugate plane of the optical system 3, as shown in FIG. 2. The liquid crystal panel 18 is disposed in the demagnifying-side conjugate plane of the optical system 3.

The liquid crystal panel 18 disposed in the demagnifying-side conjugate plane forms a projection image on one side of the optical axis N of the optical system. 3, as shown in FIG. 2. A magnified image projected by the optical system 3 onto the screen S is formed on the other side of the optical axis N.

Examples 1 to 8 will be described below as examples of the configuration of the optical system 3 incorporated in the projector 1.

Example 1

Figure 3:
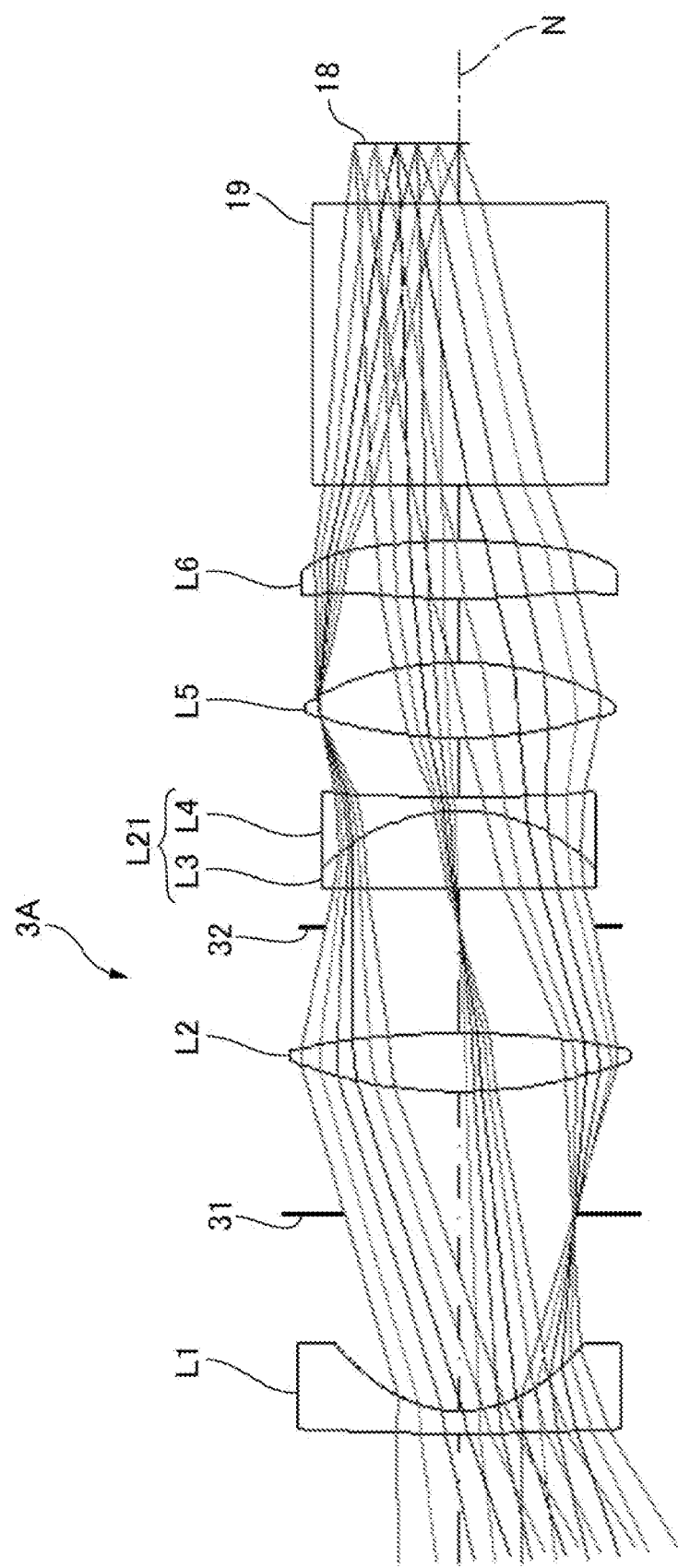
FIG. 3 is a beam diagram showing beams traveling in an optical system according to Example 1.

FIG. 3 is a beam diagram showing beams traveling in an optical system 3A according to Example 1. The optical system 3A includes six lenses, a first lens L1 to a sixth lens L6, as shown in FIG. 3. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has convex surfaces facing the magnifying side and the demagnifying side. The fifth lens L5 has spherical surfaces on opposite sides. The sixth lens L6 has positive power. The sixth lens L6 has convex surfaces facing the magnifying side and the demagnifying side. The sixth lens L6 has aspherical surfaces on opposite sides. The first lens L1 and the sixth lens L6 are made of plastic. The second lens L2, the third lens L3, the fourth lens L4, and the fifth lens L5 are made of glass. The third lens L3 and the fourth lens L4 are bonded to each other into a doublet L21.

The optical system 3A includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3A. The opening diameter of the aperture stop 32 is the opening diameter of the entrance pupil of the optical system 3A.

In the optical system 3A, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis. In the present example, the angle between the central beam of each luminous flux and the optical axis N is smaller than or equal to ±5°.

Data on the optical system 3A according to Example 1 are listed below. In the table below, FNo represents the f-number of the optical system 3A, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the fifth lens L5 made of glass, Fp represents the focal length of the sixth lens L6 made of plastic, φent represents the diameter of the entrance pupil, and υd2 represents the Abbe number of the second lens L2 at the line d.

| | |
|---|---|
| FNo | 1.440 |
| TTL | 115.005 mm |
| L | 79.520 mm |
| BF | 35.485 mm |
| LTH | 27.053 mm |
| D12 | 28.389 mm |
| SD12 | 10.300 mm |
| SD2 | 14.223 mm |
| F | 16.518 mm |
| Fg | 34.595 mm |
| Fp | 60.000 mm |
| φent | 11.485 mm |
| υd2 | 32.270 mm |

Data on the lenses of the optical system 3A are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character υd represents the Abbe number at the line d. Reference characters R and D are expressed in millimeters.

| Reference character | Surface number | R | D | nd | υd |
|---|---|---|---|---|---|
| S | 0 | infinity | 1770.000 | | |
| | 1 | infinity | 0.000 | | |
| L1 | 2* | 341.23 | 2.000 | 1.5251 | 56.3 |
| | 3* | 11.55 | 16.386 | | |
| 31 | 4 | infinity | 12.004 | | |
| L2 | 5 | 43.57 | 5.253 | 1.8503 | 32.3 |
| | 6 | −74.49 | 9.358 | | |
| 32 | 7 | infinity | 3.528 | | |
| L3 | 8 | 1604.82 | 6.883 | 1.4875 | 70.2 |
| L4 | 9 | −17.39 | 1.104 | 1.8467 | 23.8 |
| | 10 | 98.09 | 5.554 | | |

| Reference character | Surface number | R | D | nd | υd |
|---|---|---|---|---|---|
| L5 | 11 | 44.04 | 6.699 | 1.5163 | 64.1 |
| | 12 | −28.65 | 5.638 | | |
| L6 | 13* | 58.61 | 5.113 | 1.5251 | 56.3 |
| | 14* | −66.62 | 5.000 | | |
| | 15 | infinity | 0.000 | | |
| 19 | 16 | infinity | 25.000 | 1.5168 | 64.2 |
| | 17 | infinity | 5.513 | | |
| 18 | 18 | infinity | −0.027 | | |

The aspherical coefficients are listed below.

| Surface number | 2 | 3 | 13 | 14 |
|---|---|---|---|---|
| Conic constant (K) | 0.00000E+00 | −6.39685E−01 | 0.00000E+00 | 0.00000E+00 |
| Fourth coefficient (A) | 3.38886E−05 | 3.26300E−05 | −2.13024E−05 | −2.89067E−06 |
| Sixth coefficient (B) | −5.04275E−07 | −3.43821E−07 | 6.94328E−08 | 1.14908E−07 |
| Eighth coefficient (C) | 3.34595E−09 | −7.72822E−09 | −2.11364E−09 | −2.71595E−09 |
| Tenth coefficient (B) | −4.69362E−12 | 2.09542E−10 | 1.53173E−11 | 1.85619E−11 |
| Twelfth coefficient (B) | −7.67816E−14 | −2.12849E−12 | −1.09959E−13 | −9.36804E−14 |
| Fourteenth coefficient (B) | 4.49334E−16 | 9.71065E−15 | 4.78309E−16 | 2.88001E−16 |
| Sixteenth coefficient (B) | −7.46951E−19 | −1.57352E−17 | −9.75869E−19 | −4.40506E−19 |

Effects and Advantages

The optical system 3A according to the present example is formed of the first lens L1 having negative refractive power, the beam blocking stop 31, the second lens L2 having positive refractive power, the aperture stop 32, the third lens L3 having positive refractive power, the fourth lens L4 having negative refractive power, the fifth lens L5 having positive refractive power, and the sixth lens L6 having positive refractive power, with the first to sixth lenses sequentially arranged from the magnifying side toward the demagnifying side. The third lens L3 and the fourth lens L4 are bonded to each other into the doublet L21. The doublet L21 has negative refractive power. The fifth lens L5 is made of glass and has spherical surfaces on opposite sides. The sixth lens L6 is made of plastic and has aspherical surfaces on opposite sides. In the optical system 3A, the portion on the demagnifying side of the sixth lens L6 is a telecentric portion.

The optical system 3A according to the present example satisfies Conditional Expression (1) below, $$SD12/SD2<0.9 \tag{1}$$

where SD12 represents the effective radius of the stop 31, and SD2 represents the effective radius of the second lens L2.

The optical system 3A according to the present example, which includes the six lenses having the refractive power and arranged as described above, can ensure brightness of 1.6 or greater in terms of f-number and correct a variety of types of aberration in a satisfactory manner. Furthermore, since the beam blocking stop 31 is disposed between the first lens L1 and the second lens L2, and the aperture stop 32 is disposed between the second lens L2 and the third lens L3, deterioration of the lens performance at the periphery of the magnified image can be suppressed even in the configuration in which the projection lens is formed of as few as six lenses.

Conditional Expression (1) represents the ratio between the effective radius SD12 of the beam blocking stop and the effective radius SD2 of the second lens. The optical system 3A according to the present example, which satisfies Conditional Expression (1), can appropriately block the periphery of the projection light.

That is, in the present example,
SD12 10.300 mm
SD2 14.223 mm
are satisfied. SD12/SD2=0.724 is therefore achieved.

In the present example, the sixth lens L6 is a aspherical lens made of plastic, and the fifth lens L5 is a spherical lens made of glass. The variety of types of aberration can therefore be corrected in a more satisfactory manner than in a case where both the fifth lens L5 and the sixth lens L6 are spherical lenses made of glass. Moreover, the coefficient of thermal expansion of glass lenses is smaller than that of plastic lenses. The optical system is therefore less affected by heat than in a case where both the fifth lens L5 and the sixth lens L6 are aspherical lenses made of plastic.

The demagnifying-side portion of the optical system 3A according to the present example is a telecentric portion. Therefore, when the optical system. 3A is incorporated into the projector 1, the positional accuracy of the optical system 3A with respect to the liquid crystal panel 18 is not as strict as that in a case where the demagnifying-side portion is not a telecentric portion. Furthermore, since the projection light from the liquid crystal panel 18 is parallelized light, the variety of aberrations produced by the optical system 3A are likely to be suppressed.

In the present example, the first lens L1 is made of plastic and has aspherical surfaces on opposite sides. The shape of the first lens L1, which is located in a position closest to the magnifying side, is therefore flexibly determined. Distortion of the magnified image is thus readily corrected.

In the present example, the third lens L3 and the fourth lens L4 are made of glass. The two lenses are therefore readily bonded to each other into a doublet.

In the present example, Conditional Expression (2) below is satisfied, $$0.3<Fg/Fp<0.8 \tag{2}$$

where Fp represents the focal length of the sixth lens L6 made of plastic, and Fg represents the focal length of the fifth lens L5 made of glass.

That is, in the present example,
Fg 34.595 mm
Fp 60.000 mm
are satisfied. Fg/Fp=0.577 is therefore achieved.

The optical system 3A according to the present example, which satisfies Conditional Expression (2), can correct the variety of types of aberration in a satisfactory manner while suppressing degradation of the resolution resulting from heat. That is, when Fg/Fp in Conditional Expression (2) is greater than the upper limit, the aberrations can be corrected, but the sixth lens L6 made of plastic tends to be affected by heat, so that the resolution is likely to deteriorate. When Fg/Fp in Conditional Expression (2) is smaller than the lower limit, the deterioration of the resolution resulting from heat is suppressed, but it is difficult to correct the variety of types of aberrations.

In the present example, Conditional Expression (3) below is satisfied, $$vd2<45 \tag{3}$$

where vd2 represent the Abbe number of the second lens L2 at the line d.

That is, in the present example, vd2=32.270 is achieved.

The optical system 3A, which satisfies Conditional Expression (3), is likely to correct the chromatic aberrations produced by the first lens.

In the present example, Conditional Expression (4) below is satisfied, $$0.25<LTH/L<0.5 \tag{4}$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

That is, in the present example,
LTH 27.053 mm
L 79.520 mm
are satisfied. LTH/L=0.340 is therefore achieved.

The optical system 3A according to the present example, which satisfies Conditional Expression (4), can suppress deterioration of the resolution of the magnified image resulting from heat while allowing the lenses to be readily manufactured. That is, when LTH/Lin Conditional Expression (4) is greater than the upper limit, the lens thickness of each of the lenses increases, so that the lenses are likely to be affected by heat. The resolution provided by the optical system is therefore likely to deteriorate due to heat. When LTH/L in Conditional Expression (4) is greater than the upper limit, the deterioration of the resolution provided by the optical system resulting from heat can be suppressed, but the lenses each needs to be thin, resulting in a difficulty in manufacturing lenses each having necessary refractive power.

In the present example, Conditional Expression (5) below is satisfied, $$0.2<D12/L<0.5 \tag{5}$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

That is, in the present example,
D12 28.389 mm
L 79.520 mm
are satisfied. D12/L=0.357 is therefore achieved.

The projection system 3A according to the present example, which satisfies Conditional Expression (5), can suppress an increase in the overall length of the optical system 3A while suppressing a decrease in the amount of light at the periphery of the projection light. That is, the optical system 3A according to the present example, which satisfies Conditional Expression (5), provides an appropriate air spacing between the first lens L1 and the second lens L2 and hence allows the projection light to appropriately spread between the first lens L1 and the second lens L2. The variety of types of aberration are thus likely to be corrected at each image height. In particular, astigmatism is likely to be corrected at each image height, whereby a sufficient amount of light at the periphery of the projection light can be ensured. When D12/L in Conditional Expression (5) is greater than the upper limit, astigmatism is readily corrected, and a sufficient amount of light at the periphery of the projection light is readily ensured, but the overall length of the optical system 3A is likely to increase. When D12/L in Conditional Expression (5) is smaller than the lower limit, the overall length of the optical system 3A is readily shortened, but insufficient correction of astigmatism causes a decrease in the amount of light at the periphery of the projection light.

In the present example, Conditional Expression (6) below is satisfied, $$F/\varphi ent < 1.6 \quad (6)$$

where F represents the focal length of the overall optical system, and φent represents the diameter of the entrance pupil of the optical system.

That is, in the present example,
F 16.518 mm
φent 11.485 mm
are satisfied. F/φent=1.438 is therefore achieved.

The optical system 3A according to the present example, which satisfies Conditional Expression (6), has sufficient brightness.

Figure 4:
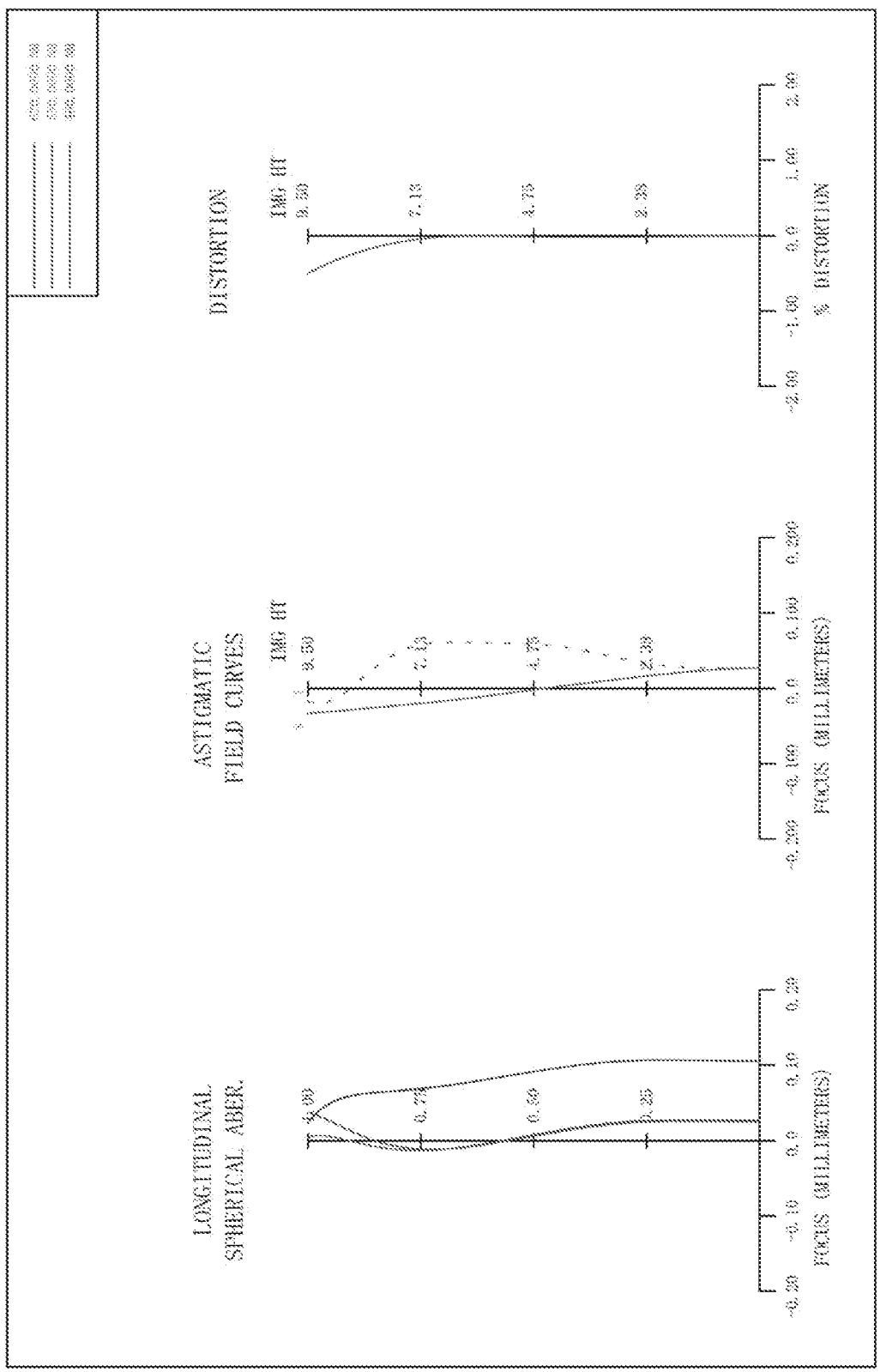
FIG. 4 shows a longitudinal aberration, astigmatism, and distortion in Example 1.

FIG. 4 shows the longitudinal aberration, astigmatism, and distortion of the magnified image produced by the optical system 3A. The optical system 3A according to the present example allows suppression of the variety of types of aberration of the magnified image, as shown in FIG. 4.

Example 2

Figure 5:
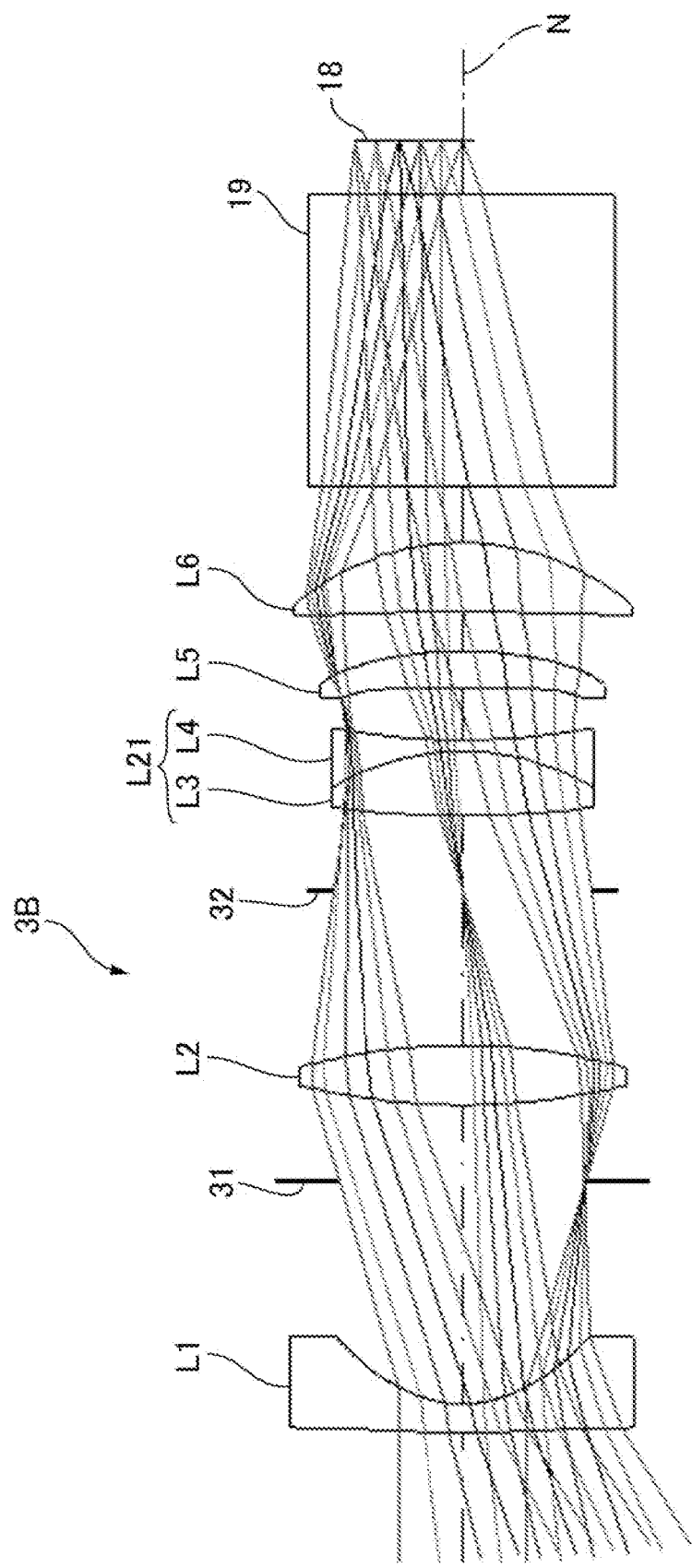
FIG. 5 is a beam diagram showing beams traveling in the optical system according to Example 2.

FIG. 5 is a beam diagram showing beams traveling in an optical system 3B according to Example 2. The optical system 3B includes six lenses, a first lens L1 to a sixth lens L6, as shown in FIG. 5. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has a concave surface facing the magnifying side and a convex surface facing the demagnifying side. The fifth lens L5 has aspherical surfaces on opposite sides. The sixth lens L6 has positive power. The sixth lens L6 has a concave surface facing the magnifying side and a convex surface facing the demagnifying side. The sixth lens L6 has spherical surfaces on opposite sides. The first lens L1 and the fifth lens L5 are made of plastic. The second lens L2, the third lens L3, the fourth lens L4, and the sixth lens L6 are made of glass. The third lens L3 and the fourth lens L4 are bonded to each other into a doublet L21.

The optical system 3B includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3B. The opening diameter of the aperture stop 32 is the opening diameter of the entrance pupil of the optical system 3B.

In the optical system 3B, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3B according to Example 2 are listed below. In the table below, FNo represents the f-number of the optical system 3B, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the sixth lens L6 made of glass, Fp represents the focal length of the fifth lens L5 made of plastic, φent represents the diameter of the entrance pupil, and vd2 represents the Abbe number of the second lens L2 at the line d.

| | |
|---|---|
| FNo | 1.439 |
| TTL | 115.383 mm |
| L | 79.520 mm |
| BF | 35.863 mm |
| LTH | 24.225 mm |
| D12 | 26.668 mm |
| SD12 | 10.975 mm |
| SD2 | 13.315 mm |
| F | 16.451 mm |
| Fg | 35.495 mm |
| Fp | 71.722 mm |
| φent | 11.443 mm |
| vd2 | 37.160 mm |

Data on the lenses of the optical system 3B are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character νd represents the Abbe number at the line d. Reference characters R and D are

| Reference character | Surface number | R | D | nd | νd |
|---|---|---|---|---|---|
| S | 0 | infinity | 1770.000 | | |
|   | 1 | infinity | 0.000 | | |
| L1 | 2* | 129.12 | 2.550 | 1.5251 | 56.3 |
|   | 3* | 11.14 | 20.000 | | |
| 31 | 4 | infinity | 6.668 | | |
| L2 | 5 | 62.15 | 5.305 | 1.8340 | 37.2 |
|   | 6 | −54.80 | 13.791 | | |
| 32 | 7 | infinity | 6.675 | | |
| L3 | 8 | 94.87 | 5.932 | 1.6180 | 63.3 |
| L4 | 9 | −22.40 | 1.000 | 1.8467 | 23.8 |
|   | 10 | 64.02 | 4.675 | | |
| L5 | 11* | −501.80 | 3.254 | 1.5251 | 56.3 |
|   | 12* | −35.24 | 3.486 | | |
| L6 | 13 | −324.71 | 6.184 | 1.6968 | 55.5 |
|   | 14 | −23.25 | 5.000 | | |
|   | 15 | infinity | 0.000 | | |
| 19 | 16 | infinity | 26.000 | 1.5168 | 64.2 |
|   | 17 | infinity | 4.858 | | |
| 18 | 18 | infinity | 0.005 | | |

The aspherical coefficients are listed below.

| Surface number | 2 | 3 | 11 | 12 |
|---|---|---|---|---|
| Conic constant (K) | −2.67644E+01 | −5.97452E−01 | 0.00000E+00 | 0.00000E+00 |
| Fourth co-efficient (A) | −4.36379E−06 | 8.46162E−07 | −2.87431E−05 | 5.51627E−06 |
| Sixth co-efficient (B) | −1.02782E−07 | −1.04845E−06 | −2.53511E−07 | 1.05185E−07 |
| Eighth co-efficient (C) | 8.68614E−10 | 2.91541E−08 | 2.70722E−09 | −6.64021E−09 |
| Tenth co-efficient (B) | −5.91596E−12 | −5.79947E−10 | −6.53760E−11 | 9.90848E−11 |
| Twelfth co-efficient (B) | 5.07408E−14 | 6.62771E−12 | 6.28619E−13 | −9.10691E−13 |
| Fourteenth co-efficient (B) | −2.70433E−16 | −3.92181E−14 | −3.35608E−15 | 4.28248E−15 |
| Sixteenth co-efficient (B) | 5.35825E−19 | 9.26109E−17 | 7.18525E−18 | −7.97278E−18 |

In the present example, Conditional Expression (1) below is satisfied, $$SD12/SD2<0.9 \quad (1)$$

where SD12 represents the effective radius of the stop 31, and SD2 represents the effective radius of the second lens L2.

In the present example,
SD12 10.975 mm
SD2 13.315 mm
are satisfied. SD12/SD2=0.824 is therefore achieved.

In the present example, Conditional Expression (2) below is satisfied, $$0.3<Fg/Fp<0.8 \quad (2)$$

where Fp represents the focal length of the fifth lens L5 made of plastic, and Fg represents the focal length of the sixth lens L6 made of glass.

In the present example,
Fg 35.495 mm
Fp 71.722 mm
are satisfied. Fg/Fp=0.495 is therefore achieved.

In the present example, Conditional Expression (3) below is satisfied, $$\nu d2<45 \quad (3)$$

where νd2 represent the Abbe number of the second lens L2 at the line d.

In the present example, νd2=37.160 is achieved.

In the present example, Conditional Expression (4) below is satisfied, $$0.25<LTH/L<0.5 \quad (4)$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 24.225 mm
L 79.520 mm
are satisfied. LTH/L=0.305 is therefore achieved.

In the present example, Conditional Expression (5) below is satisfied, $$0.2<D12/L<0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 26.668 mm
L 79.520 mm
are satisfied. D12/L=0.335 is therefore achieved.

In the present example, Conditional Expression (6) below is satisfied, $$F/\varphi ent<1.6 \quad (6)$$

where F represents the focal length of the overall optical system, and φent represents the diameter of the entrance pupil of the optical system.

In the present example,
F 16.451 mm
φent 11.443 mm
are satisfied. F/φent=1.438 is therefore achieved.

Effects and Advantages

Figure 6:
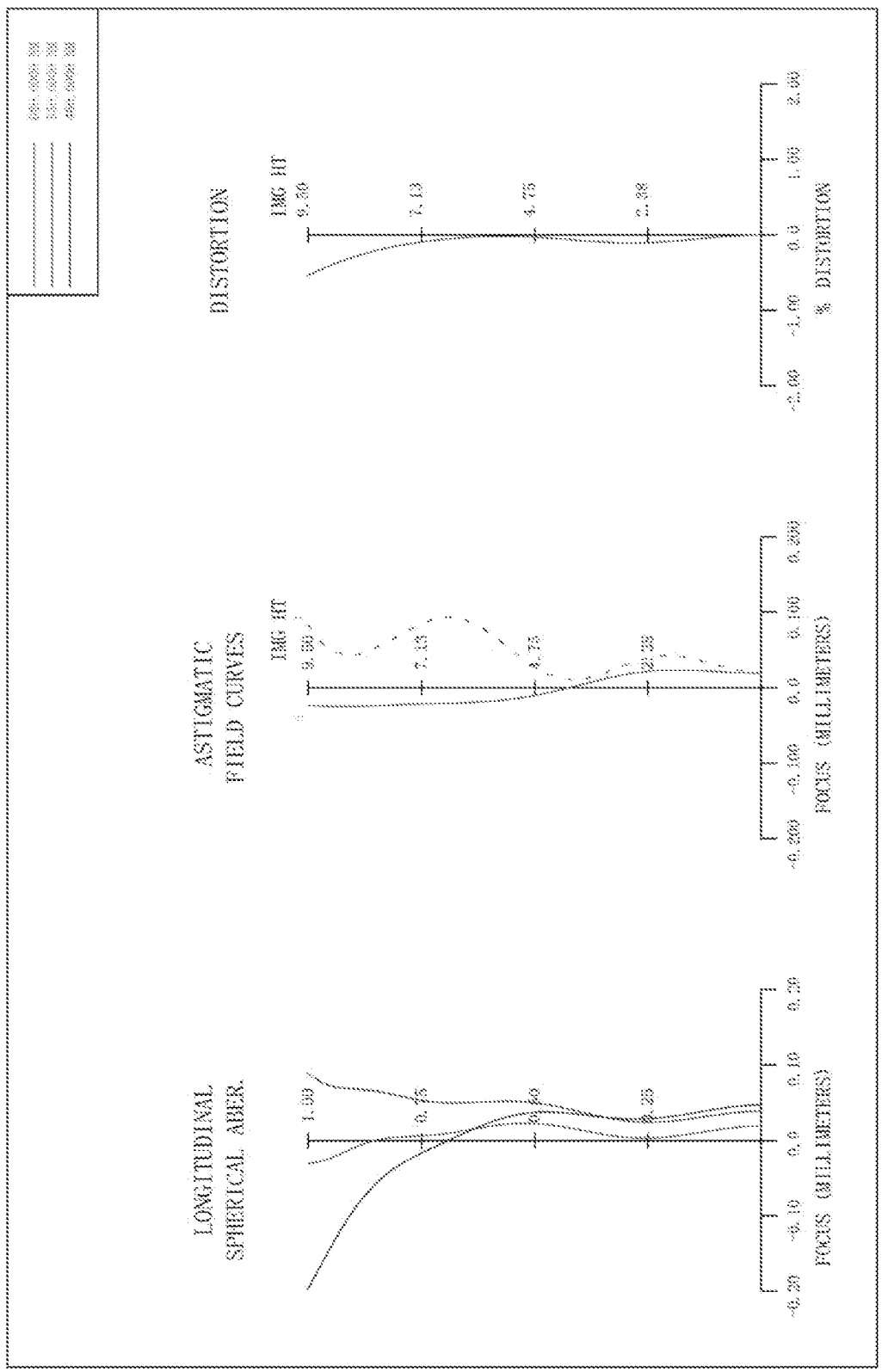
FIG. 6 shows the longitudinal aberration, astigmatism, and distortion in Example 2.

The optical system 3B according to the present example can provide the same effects and advantages as those provided by the optical system 3A according to Example 1. FIG. 6 shows the longitudinal aberration, astigmatism, and distortion of the magnified image produced by the optical system 3B. The optical system 3B according to the present example allows suppression of the variety of types of aberration of the magnified image, as shown in FIG. 6.

Example 3

Figure 7:
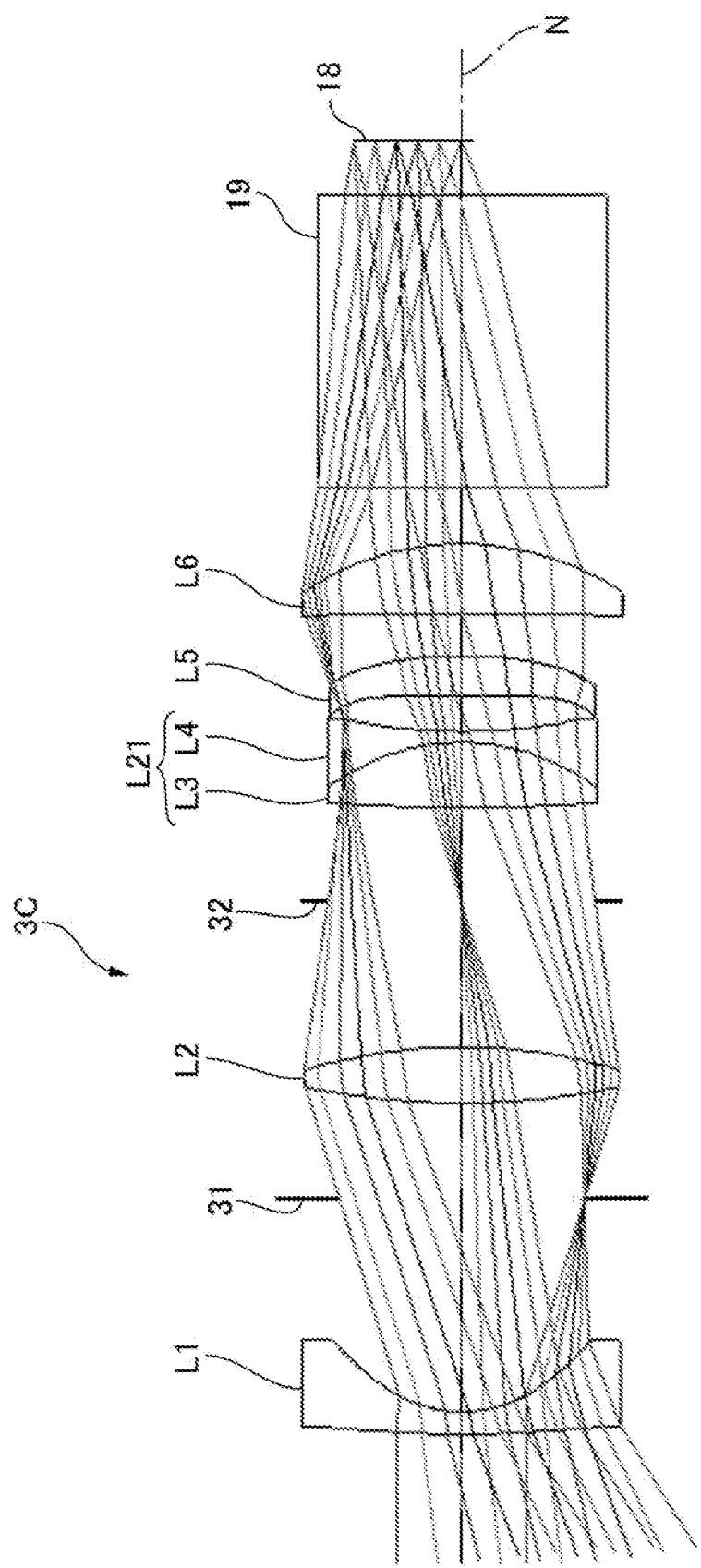
FIG. 7 is a beam diagram showing beams traveling in the optical system according to Example 3.

FIG. 7 is a beam diagram showing beams traveling in an optical system 3C according to Example 3. The optical system 3C includes six lenses, a first lens L1 to a sixth lens L6, as shown in FIG. 7. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has a concave surface facing the magnifying side and a convex surface facing the demagnifying side. The fifth lens L5 has aspherical surfaces on opposite sides. The sixth lens L6 has positive power. The sixth lens L6 has a concave surface facing the magnifying side and a convex surface facing the demagnifying side. The sixth lens L6 has spherical surfaces on opposite sides. The first lens L1 and the fifth lens L5 are made of plastic. The second lens L2, the third lens L3, the fourth lens L4, and the sixth lens L6 are made of glass. The third lens L3 and the fourth lens L4 are bonded to each other into a doublet L21.

The optical system 3C includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3C. The opening diameter of the aperture stop 32 is the opening diameter of the entrance pupil of the optical system 3C.

In the optical system 3C, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3C according to Example 3 are listed below. In the table below, FNo represents the f-number of the optical system 3C, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the sixth lens L6 made of glass, Fp represents the focal length of the fifth lens L5 made of plastic, φent represents the diameter of the entrance pupil, and νd2 represents the Abbe number of the second lens L2 at the line d.

| | |
|---|---|
| FNo | 1.440 |
| TTL | 115.383 mm |
| L | 79.520 mm |
| BF | 35.863 mm |
| LTH | 23.798 mm |
| D12 | 27.493 mm |
| SD12 | 10.700 mm |
| SD2 | 13.586 mm |
| F | 16.451 mm |
| Fg | 35.772 mm |
| Fp | 70.000 mm |
| φent | 11.439 mm |
| νd2 | 40.100 mm |

Data on the lenses of the optical system 3C are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character νd represents the Abbe number at the line d. Reference characters R and D are

| Reference character | Surface number | R | D | nd | νd |
|---|---|---|---|---|---|
| S | 0 | infinity | 1770.000 | | |
| | 1 | infinity | 0.000 | | |
| L1 | 2* | 93.13 | 2.000 | 1.5251 | 56.3 |
| | 3* | 10.85 | 19.000 | | |
| 31 | 4 | infinity | 8.493 | | |
| L2 | 5 | 65.49 | 5.011 | 1.7620 | 40.1 |
| | 6 | −45.93 | 12.996 | | |
| 32 | 7 | infinity | 8.336 | | |
| L3 | 8 | 159.32 | 6.000 | 1.7440 | 44.8 |
| L4 | 9 | −19.02 | 1.000 | 1.8467 | 23.8 |
| | 10 | 51.56 | 3.210 | | |
| L5 | 11* | infinity | 3.487 | 1.5251 | 56.3 |
| | 12* | −36.90 | 3.687 | | |
| L6 | 13 | −696.71 | 6.300 | 1.6968 | 55.5 |
| | 14 | −24.24 | 5.000 | | |
| | 15 | infinity | 0.000 | | |

-continued

| Reference character | Surface number | R | D | nd | νd |
|---|---|---|---|---|---|
| 19 | 16 | infinity | 25.500 | 1.5168 | 64.2 |
|  | 17 | infinity | 5.193 |  |  |
| 18 | 18 | infinity | −0.023 |  |  |

The aspherical coefficients are listed below.

| Surface number | 2 | 3 | 11 | 12 |
|---|---|---|---|---|
| Conic constant (K) | 1.19315E+01 | −5.72913E−01 | 0.00000E+00 | 0.00000E+00 |
| Fourth co-efficient (A) | −1.86889E−06 | 5.76402E−06 | −3.93378E−05 | −6.89212E−06 |
| Sixth co-efficient (B) | −1.24199E−07 | −8.72513E−07 | −3.42682E−07 | 2.26648E−08 |
| Eighth co-efficient (C) | 7.79164E−10 | 2.73189E−08 | 2.33489E−09 | −6.87196E−09 |
| Tenth co-efficient (B) | −5.40741E−12 | −5.82445E−10 | −6.74914E−11 | 9.99608E−11 |
| Twelfth co-efficient (B) | 4.99675E−14 | 6.67954E−12 | 6.54690E−13 | −9.06583E−13 |
| Fourteenth co-efficient (B) | −2.64914E−16 | −3.89179E−14 | −3.17334E−15 | 4.28220E−15 |
| Sixteenth co-efficient (B) | 5.17181E−19 | 9.02481E−17 | 4.19952E−18 | −8.44637E−18 |

In the present example, Conditional Expression (1) below is satisfied $$SD12/SD2<0.9 \quad (1)$$

where SD12 represents the effective radius of the stop 31, and SD2 represents the effective radius of the second lens L2.

In the present example,
SD12 10.700 mm
SD2 13.586 mm
are satisfied. SD12/SD2=0.788 is therefore achieved.

In the present example, Conditional Expression (2) below is satisfied, $$0.3<Fg/Fp<0.8 \quad (2)$$

where Fp represents the focal length of the fifth lens L5 made of plastic, and Fg represents the focal length of the sixth lens L6 made of glass.

In the present example,
Fg 35.772 mm
Fp 70.000 mm
are satisfied. Fg/Fp=0.511 is therefore achieved.

In the present example, Conditional Expression (3) below is satisfied, $$vd2<45 \quad (3)$$

where vd2 represent the Abbe number of the second lens L2 at the line d.

In the present example, vd2=40.100 is achieved.

In the present example, Conditional Expression (4) below is satisfied, $$0.25<LTH/L<0.5 \quad (4)$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 23.798 mm
L 79.520 mm
are satisfied. LTH/L=0.299 is therefore achieved.

In the present example, Conditional Expression (5) below is satisfied, $$0.2<D12/L<0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 27.493 mm
L 79.520 mm
are satisfied. D12/L=0.346 is therefore achieved.

In the present example, Conditional Expression (6) below is satisfied, $$F/\varphi ent<1.6 \quad (6)$$

where F represents the focal length of the overall optical system, and φent represents the diameter of the entrance pupil of the optical system.

In the present example,
F 16.451 mm
φent 11.439 mm
are satisfied. F/φent=1.438 is therefore achieved.

Effects and Advantages

Figure 8:
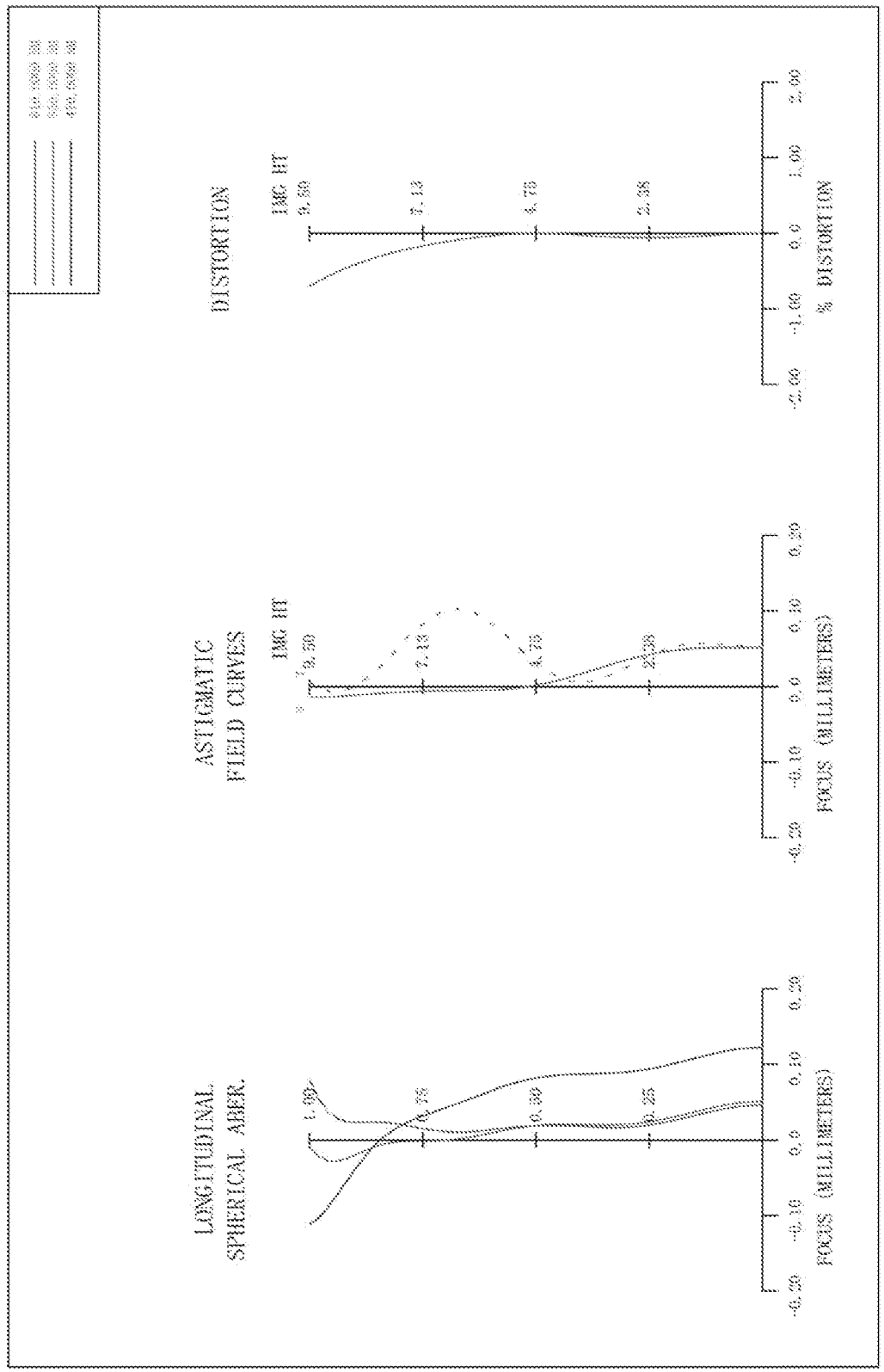
FIG. 8 shows the longitudinal aberration, astigmatism, and distortion in Example 3.

The optical system 3C according to the present example can provide the same effects and advantages as those provided by the optical system 3A according to Example 1. FIG. 8 shows the longitudinal aberration, astigmatism, and distortion of the magnified image produced by the optical system 3C. The optical system 3C according to the present example allows suppression of the variety of types of aberration of the magnified image, as shown in FIG. 8.

Example 4

Figure 9:
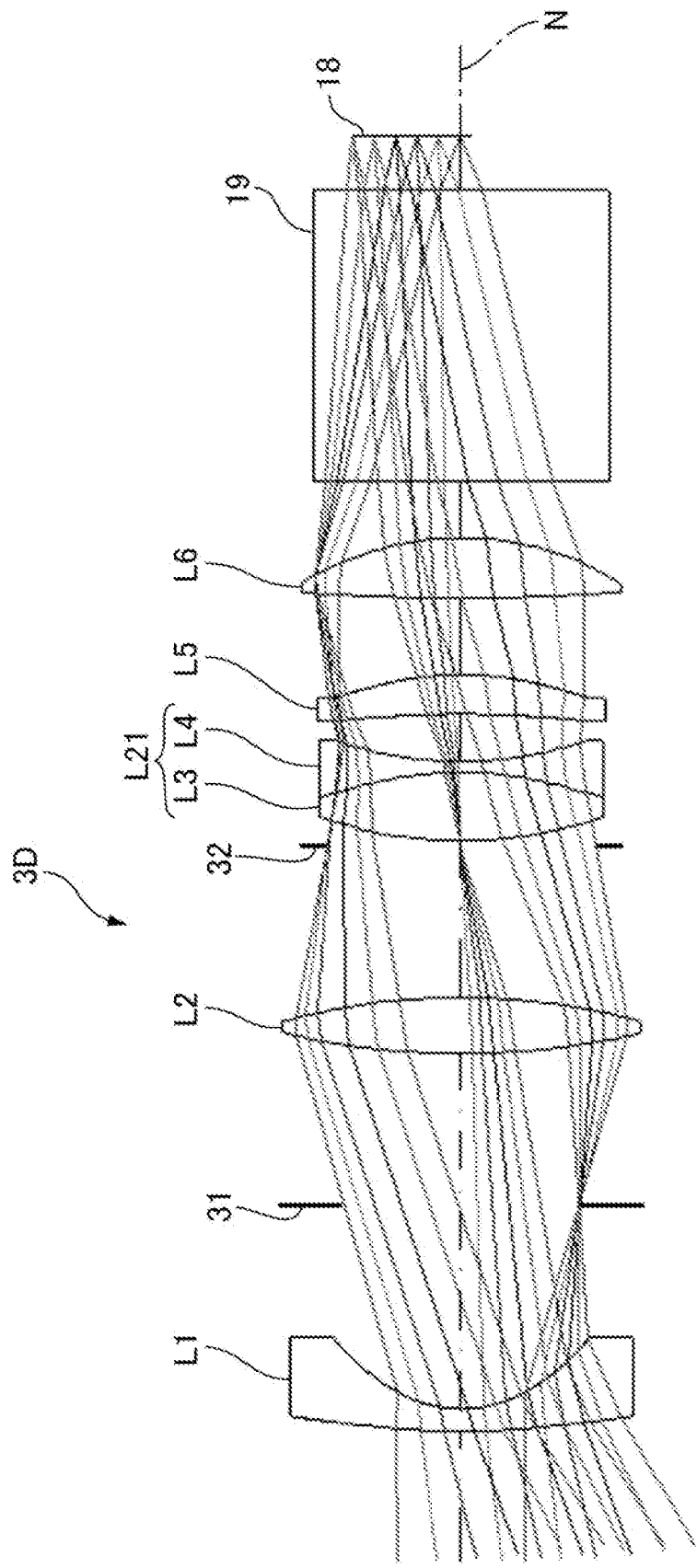
FIG. 9 is a beam diagram showing beams traveling in the optical system according to Example 4.

FIG. 9 is a beam diagram showing beams traveling in an optical system 3D according to Example 4. The optical system 3D includes six lenses, a first lens L1 to a sixth lens L6, as shown in FIG. 9. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has a concave surface facing the magnifying side and a convex surface facing the demagnifying side. The fifth lens L5 has aspherical surfaces on opposite sides. The sixth lens L6 has positive power. The sixth lens L6 has convex surfaces facing the magnifying side and the demagnifying side. The sixth lens L6 has spherical surfaces on opposite sides. The first lens L1 and the fifth lens L5 are made of plastic. The second lens L2, the third lens L3, the fourth lens L4, and the sixth lens L6 are made of glass. The third lens L3 and the fourth lens L4 are bonded to each other into a doublet L21.

The optical system 3D includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3D. The opening diameter of the aperture stop 32 is the opening diameter of the entrance pupil of the optical system 3D.

In the optical system 3D, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3D according to Example 4 are listed below. In the table below, FNo represents the f-number of the optical system 3D, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the sixth lens L6 made of glass, Fp represents the focal length of the fifth lens L5 made of plastic, φent represents the diameter of the entrance pupil, and νd2 represents the Abbe number of the second lens L2 at the line d.

| | |
|---|---|
| FNo | 1.440 |
| TTL | 115.945 mm |
| L | 80.050 mm |
| BF | 35.895 mm |
| LTH | 23.171 mm |
| D12 | 31.803 mm |
| SD12 | 10.300 mm |
| SD2 | 14.500 mm |
| F | 16.451 mm |
| Fg | 36.941 mm |
| Fp | 65.000 mm |
| φent | 11.445 mm |
| νd2 | 31.343 mm |

Data on the lenses of the optical system 3D are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character νd represents the Abbe number at the line d. Reference characters R and D are expressed in millimeters.

| Reference character | Surface number | R | D | nd | νd |
|---|---|---|---|---|---|
| S | 0 | infinity | 1770.000 | | |
| | 1 | infinity | 0.000 | | |
| L1 | 2* | 57.54 | 2.000 | 1.5251 | 56.3 |
| | 3* | 10.41 | 18.090 | | |
| 31 | 4 | infinity | 13.713 | | |
| L2 | 5 | 67.54 | 5.000 | 1.9037 | 31.3 |
| | 6 | −58.53 | 13.520 | | |
| 32 | 7 | infinity | 0.500 | | |
| L3 | 8 | 36.98 | 6.261 | 1.4970 | 81.5 |
| L4 | 9 | −31.95 | 1.000 | 1.8590 | 22.7 |
| | 10 | 33.83 | 4.204 | | |
| L5 | 11* | −103.82 | 3.541 | 1.5251 | 56.3 |
| | 12* | −26.06 | 6.852 | | |
| L6 | 13 | 176.92 | 5.369 | 1.6204 | 60.3 |
| | 14 | −26.13 | 5.000 | | |
| | 15 | infinity | 0.000 | | |
| 19 | 16 | infinity | 26.500 | 1.5168 | 64.2 |
| | 17 | infinity | 4.511 | | |
| 18 | 18 | infinity | −0.002 | | |

The aspherical coefficients are listed below.

| Surface number | 2 | 3 | 11 | 12 |
|---|---|---|---|---|
| Conic constant (K) | −3.65860E+01 | −5.50533E−01 | 0.00000E+00 | 0.00000E+00 |
| Fourth coefficient (A) | 8.38590E−06 | −8.25846E−06 | −7.55976E−06 | 1.70243E−05 |
| Sixth coefficient (B) | −1.25255E−07 | −1.02974E−06 | −3.58349E−09 | 4.71389E−08 |
| Eighth coefficient (C) | 8.38134E−10 | 2.98989E−08 | 6.05734E−10 | 2.47509E−10 |

-continued

| Surface number | 2 | 3 | 11 | 12 |
|---|---|---|---|---|
| Tenth coefficient (B) | −6.27076E−12 | −5.96851E−10 | −7.72729E−13 | 1.81113E−12 |
| Twelfth coefficient (B) | 5.22779E−14 | 6.68429E−12 | −6.63075E−15 | −8.29220E−15 |
| Fourteenth coefficient (B) | −2.63751E−16 | −3.92311E−14 | 1.35560E−20 | −2.47331E−20 |
| Sixteenth coefficient (B) | 5.16949E−19 | 9.31637E−17 | −7.26887E−24 | −1.84534E−22 |

In the present example, Conditional Expression (1) below is satisfied, $$SD12/SD2 < 0.9 \quad (1)$$

where SD12 represents the effective radius of the stop 31, and SD2 represents the effective radius of the second lens L2.

In the present example,
SD12 10.300 mm
SD2 14.500 mm
are satisfied. SD12/SD2=0.710 is therefore achieved.

In the present example, Conditional Expression (2) below is satisfied, $$0.3 < Fg/Fp < 0.8 \quad (2)$$

where Fp represents the focal length of the fifth lens L5 made of plastic, and Fg represents the focal length of the sixth lens L6 made of glass.

In the present example,
Fg 36.941 mm
Fp 65.000 mm
are satisfied. Fg/Fp=0.568 is therefore achieved.

In the present example, Conditional Expression (3) below is satisfied, $$vd2 < 45 \quad (3)$$

where vd2 represent the Abbe number of the second lens L2 at the line d.

In the present example, vd2=31.343 is achieved.

In the present example, Conditional Expression (4) below is satisfied, $$0.25 < LTH/L < 0.5 \quad (4)$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 23.171 mm
L 80.050 mm
are satisfied. LTH/L=0.289 is therefore achieved.

In the present example, Conditional Expression (5) below is satisfied, $$0.2 < D12/L < 0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 31.803 mm
L 80.050 mm
are satisfied. D12/L=0.397 is therefore achieved.

In the present example, Conditional Expression (6) below is satisfied, $$F/\varphi ent < 1.6 \quad (6)$$

where F represents the focal length of the overall optical system, and φent represents the diameter of the entrance pupil of the optical system.

In the present example,
F 16.451 mm
φent 11.445 mm
are satisfied. F/φent=1.437 is therefore achieved.

Effects and Advantages

Figure 10:
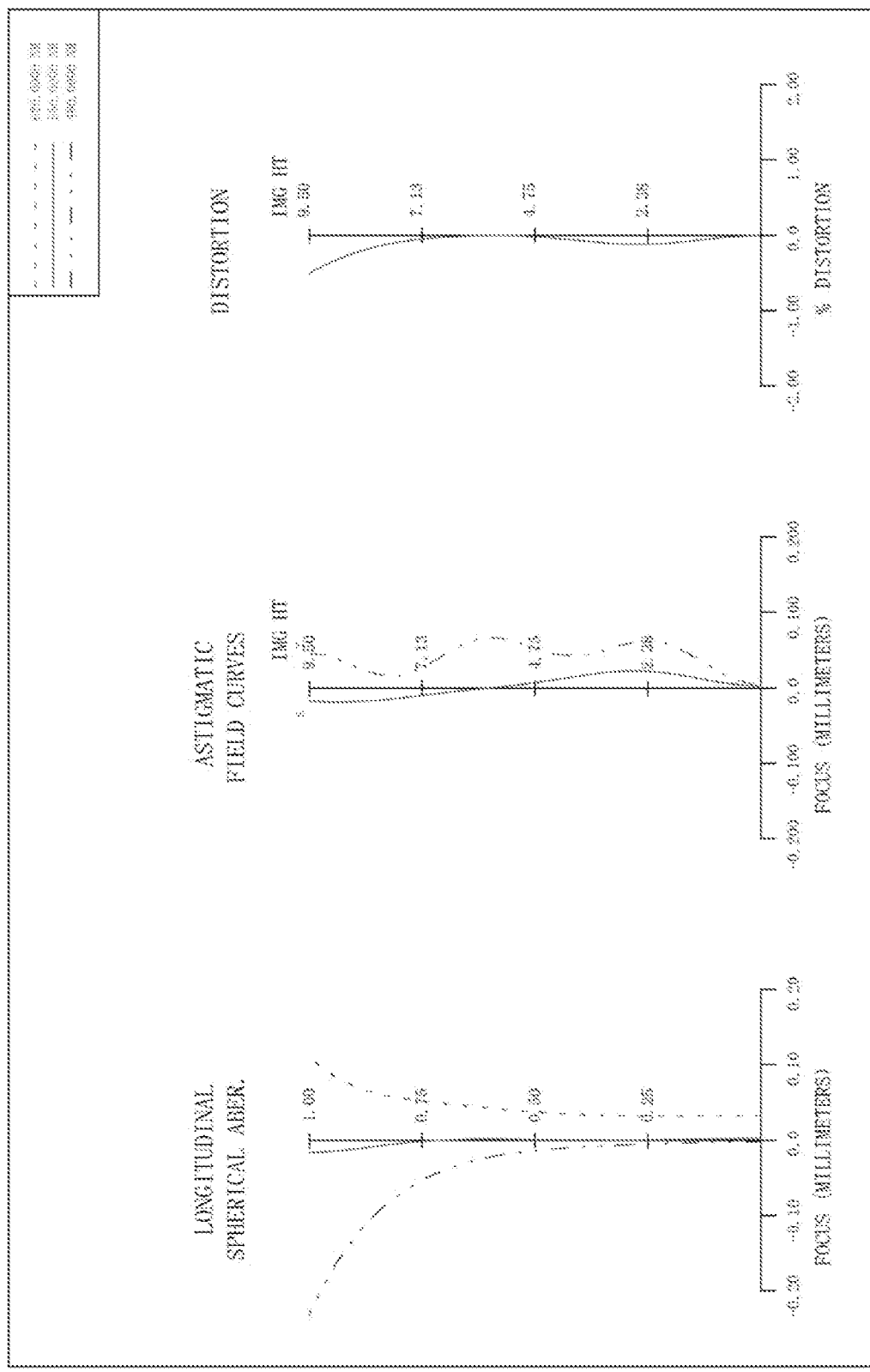
FIG. 10 shows the longitudinal aberration, astigmatism, and distortion in Example 4.

The optical system 3D according to the present example can provide the same effects and advantages as those provided by the optical system 3A according to Example 1. FIG. 10 shows the longitudinal aberration, astigmatism, and distortion of the magnified image produced by the optical system 3D. The optical system 3D according to the present example allows suppression of the variety of types of aberration of the magnified image, as shown in FIG. 10.

Example 5

Figure 11:
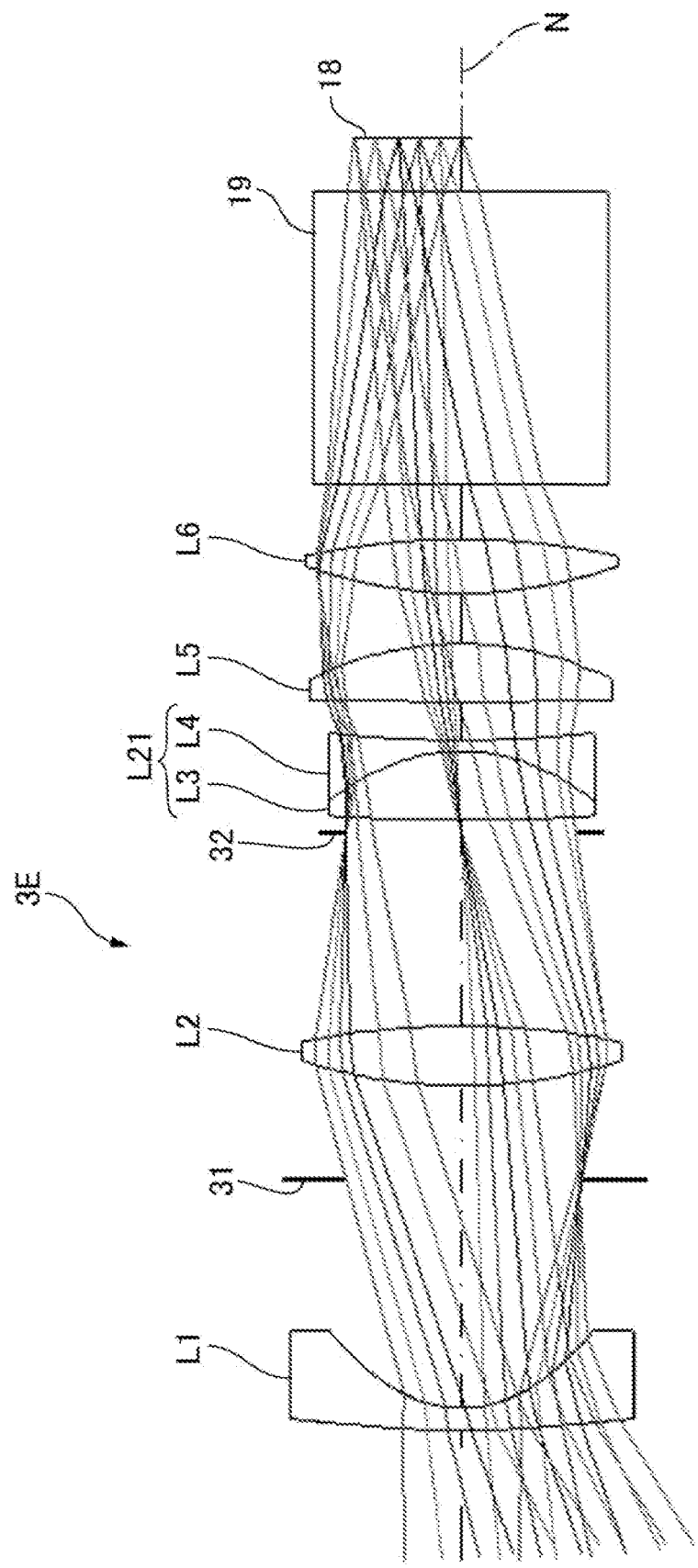
FIG. 11 is a beam diagram showing beams traveling in the optical system according to Example 5.

FIG. 11 is a beam diagram showing beams traveling in an optical system 3E according to Example 5. The optical system 3E includes six lenses, a first lens L1 to a sixth lens L6, as shown in FIG. 11. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has convex surfaces facing the magnifying side and the demagnifying side. The fifth lens L5 has spherical surfaces on opposite sides. The sixth lens L6 has positive power. The sixth lens L6 has convex surfaces facing the magnifying side and the demagnifying side. The sixth lens L6 has aspherical surfaces on opposite sides. The first lens L1 and the sixth lens L6 are made of plastic. The second lens L2, the third lens L3, the fourth lens L4, and the fifth lens L5 are made of glass. The third lens L3 and the fourth lens L4 are bonded to each other into a doublet L21.

The optical system 3E includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3E. The opening diameter of the aperture stop 32 is the opening diameter of the entrance pupil of the optical system 3E.

In the optical system 3E, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3E according to Example 5 are listed below. In the table below, FNo represents the f-number of the optical system 3E, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the fifth lens L5 made of glass, Fp represents the focal length of the sixth lens L6 made of plastic, φent represents the diameter of the entrance pupil, and vd2 represents the Abbe number of the second lens L2 at the line d.

| | |
|---|---|
| FNo | 1.560 |
| TTL | 115.882 mm |
| L | 80.036 mm |
| BF | 35.847 mm |
| LTH | 24.727 mm |
| D12 | 28.846 mm |
| SD12 | 10.500 mm |
| SD2 | 13.166 mm |
| F | 16.451 mm |
| Fg | 43.080 mm |
| Fp | 44.302 mm |
| φent | 10.567 mm |
| vd2 | 34.967 mm |

Data on the lenses of the optical system 3E are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character vd represents the Abbe number at the line d. Reference characters R and D are expressed in millimeters.

| Reference character | Surface number | R | D | nd | vd |
|---|---|---|---|---|---|
| S | 0 | infinity | 1770.000 | | |
| | 1 | infinity | 0.000 | | |
| L1 | 2* | 77.28 | 2.000 | 1.5251 | 56.3 |
| | 3* | 10.45 | 19.613 | | |
| 31 | 4 | infinity | 9.233 | | |
| L2 | 5 | 44.91 | 5.373 | 1.8010 | 35.0 |
| | 6 | −72.43 | 17.391 | | |
| 32 | 7 | infinity | 1.108 | | |
| L3 | 8 | 206.04 | 6.291 | 1.4970 | 81.5 |
| L4 | 9 | −17.49 | 1.000 | 1.8467 | 23.8 |
| | 10 | 109.37 | 3.459 | | |
| L5 | 11 | 637.13 | 5.191 | 1.5641 | 39.7 |
| | 12 | −29.55 | 4.504 | | |
| L6 | 13* | 37.82 | 4.872 | 1.5251 | 56.3 |
| | 14* | −58.33 | 5.000 | | |
| | 15 | infinity | 0.000 | | |
| 19 | 16 | infinity | 26.000 | 1.5168 | 64.2 |
| | 17 | infinity | 4.861 | | |
| 18 | 18 | infinity | −0.014 | | |

The aspherical coefficients are listed below.

| Surface number | 2 | 3 | 13 | 14 |
|---|---|---|---|---|
| Conic constant (K) | −6.45608E+01 | −5.29909E−01 | −9.39598E−01 | 0.00000E+00 |
| Fourth coefficient (A) | 9.54847E−06 | −1.97143E−05 | −2.54060E−06 | 3.90175E−06 |
| Sixth coefficient (B) | −1.66897E−07 | −2.96989E−07 | −2.44868E−09 | 2.59930E−08 |
| Eighth coefficient (C) | 1.13305E−09 | −7.43732E−10 | 1.47291E−11 | −2.15895E−10 |
| Tenth coefficient (B) | −1.91805E−12 | 4.82464E−11 | 2.70923E−15 | 5.95457E−13 |
| Twelfth coefficient (B) | −1.66161E−14 | −6.21595E−13 | 0.00000E+00 | 0.00000E+00 |
| Fourteenth coefficient (B) | 8.33118E−17 | 3.20878E−15 | 0.00000E+00 | 0.00000E+00 |
| Sixteenth coefficient (B) | −9.92558E−20 | −6.03921E−18 | 0.00000E+00 | 0.00000E+00 |

In the present example, Conditional Expression (1) below is satisfied, $$SD12/SD2 < 0.9 \quad (5)$$

where SD12 represents the effective radius of the stop 31, and SD2 represents the effective radius of the second lens L2.

In the present example,
SD12 10.500 mm
SD2 13.166 mm
are satisfied. SD12/SD2=0.798 is therefore achieved.

In the present example, Conditional Expression (2) below is satisfied, $$0.3 < Fg/Fp < 0.8 \quad (2)$$

where Fp represents the focal length of the sixth lens L6 made of plastic, and Fg represents the focal length of the fifth lens L5 made of glass.

In the present example,
Fg 43.080 mm
Fp 44.302 mm
are satisfied. Fg/Fp=0.972 is therefore achieved.

In the present example, Conditional Expression (3) below is satisfied, $$vd2 < 45 \quad (3)$$

where vd2 represent the Abbe number of the second lens L2 at the line d.

In the present example, vd2=34.967 is achieved.

In the present example, Conditional Expression (4) below is satisfied, $$0.2 < LTH/L < 0.5 \quad (4)$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 24.727 mm
L 80.036 mm
are satisfied. LTH/L=0.309 is therefore achieved.

In the present example, Conditional Expression (5) below is satisfied, $$0.2 < D12/L < 0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 28.846 mm
L 80.036 mm
are satisfied. D12/L=0.360 is therefore achieved.

In the present example, Conditional Expression (6) below is satisfied, $$F/\varphi ent < 1.6 \quad (6)$$

where F represents the focal length of the overall optical system, and φent represents the diameter of the entrance pupil of the optical system.

In the present example,
F 16.451 mm
φent 10.567 mm
are satisfied. F/φent=1.557 is therefore achieved.

Effects and Advantages

Figure 12:
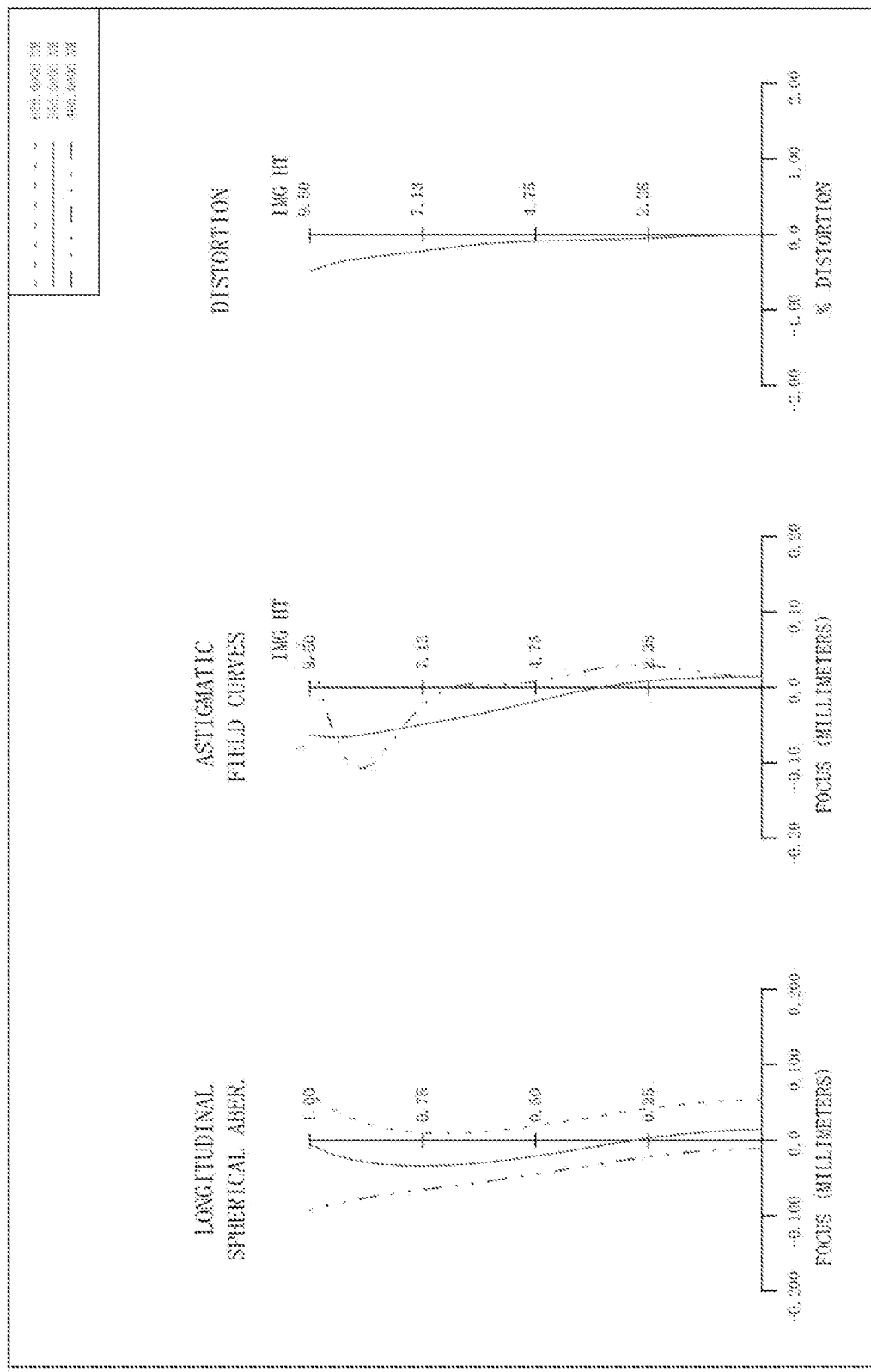
FIG. 12 shows the longitudinal aberration, astigmatism, and distortion in Example 5.

The optical system 3E according to the present example can provide the same effects and advantages as those provided by the optical system 3A according to Example 1. FIG. 12 shows the longitudinal aberration, astigmatism, and distortion of the magnified image produced by the optical system 3E. The optical system 3E according to the present example allows suppression of the variety of types of aberration of the magnified image, as shown in FIG. 12.

Example 6

Figure 13:
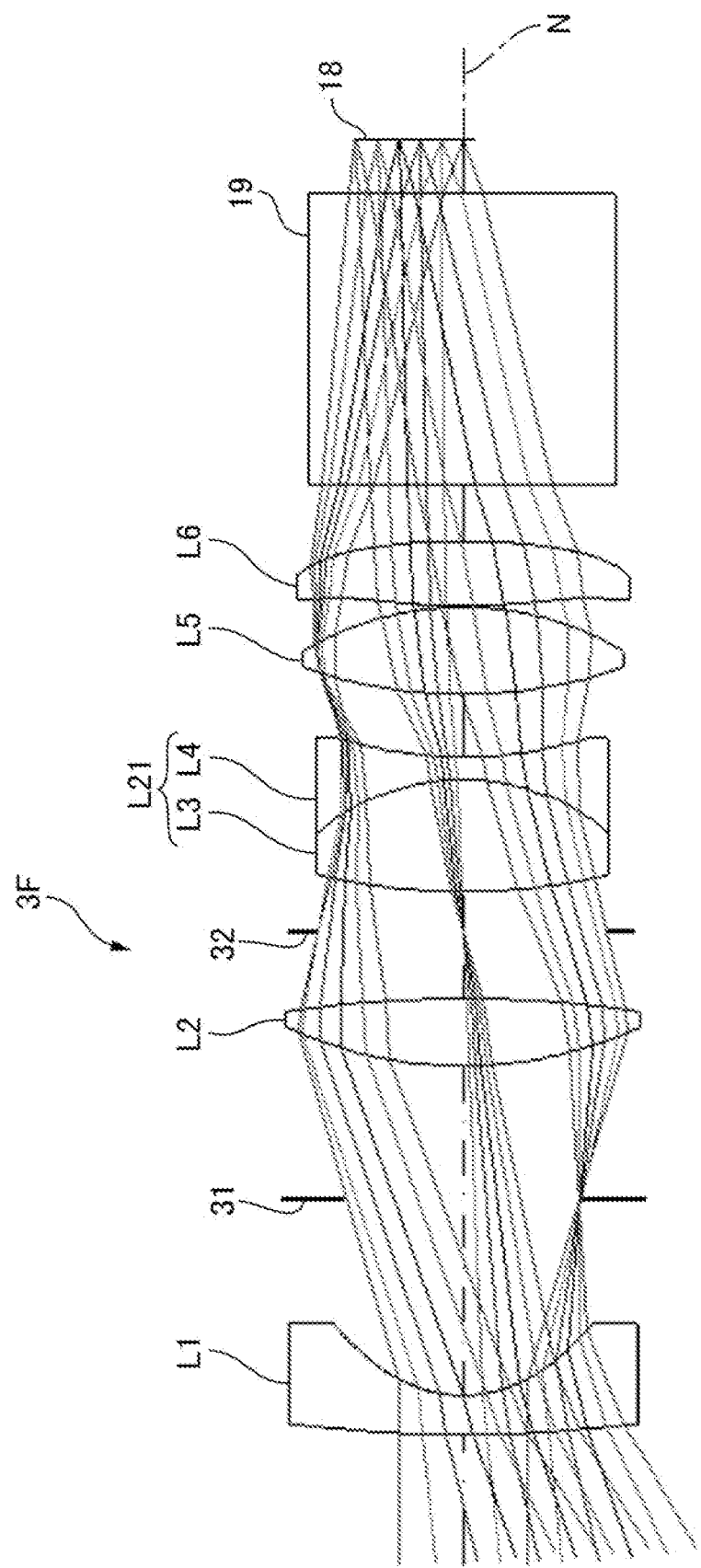
FIG. 13 is a beam diagram showing beams traveling in the optical system according to Example 6.

FIG. 13 is a beam diagram showing beams traveling in an optical system 3F according to Example 6. The optical system 3F includes six lenses, a first lens L1 to a sixth lens L6, as shown in FIG. 13. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has convex surfaces facing the magnifying side and the demagnifying side. The fifth lens L5 has spherical surfaces on opposite sides. The sixth lens L6 has positive power. The sixth lens L6 has convex surfaces facing the magnifying side and the demagnifying side. The sixth lens L6 has aspherical surfaces on opposite sides. The first lens L1 and the sixth lens L6 are made of plastic. The second lens L2, the third lens L3, the fourth lens L4, and the fifth lens L5 are made of glass. The third lens L3 and the fourth lens L4 are bonded to each other into a doublet L21.

The optical system 3F includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3F. The opening diameter of the aperture stop 32 is the opening diameter of the entrance pupil of the optical system 3F.

In the optical system 3F, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3F according to Example 6 are listed below. In the table below, FNo represents the f-number of the optical system 3F, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the fifth lens L5 made of glass, Fp represents the focal length of the sixth lens L6 made of plastic, φent represents the diameter of the entrance pupil, and νd2 represents the Abbe number of the second lens L2 at the line d.

| | |
|---|---|
| FNo | 1.440 |
| TTL | 115.369 mm |
| L | 80.050 mm |
| BF | 35.319 mm |
| LTH | 35.295 mm |
| D12 | 29.453 mm |
| SD12 | 10.300 mm |
| SD2 | 14.535 mm |
| F | 16.519 mm |
| Fg | 33.896 mm |
| Fp | 55.471 mm |
| φent | 11.484 mm |
| νd2 | 32.270 mm |

Data on the lenses of the optical system 3F are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character νd represents the Abbe number at the line d. Reference characters R and D are expressed in millimeters.

| Reference character | Surface number | R | D | nd | νd |
|---|---|---|---|---|---|
| S | 0 | infinity | 1770.000 | | |
| | 1 | infinity | 0.000 | | |
| L1 | 2* | 175.13 | 3.500 | 1.5251 | 56.3 |
| | 3* | 11.55 | 16.918 | | |
| 31 | 4 | infinity | 12.536 | | |
| L2 | 5 | 37.17 | 6.022 | 1.8503 | 32.3 |
| | 6 | −106.01 | 6.025 | | |
| 32 | 7 | infinity | 3.528 | | |
| L3 | 8 | 54.85 | 10.211 | 1.4875 | 70.2 |
| L4 | 9 | −19.14 | 2.000 | 1.8467 | 23.8 |
| | 10 | 35.79 | 5.649 | | |
| L5 | 11 | 43.61 | 7.782 | 1.5163 | 64.1 |
| | 12 | −27.61 | 0.100 | | |
| L6 | 13* | 55.06 | 5.780 | 1.5251 | 56.3 |
| | 14* | −60.09 | 5.000 | | |
| | 15 | infinity | 0.000 | | |
| 19 | 16 | infinity | 24.500 | 1.5168 | 64.2 |
| | 17 | infinity | 5.842 | | |
| 18 | 18 | infinity | −0.023 | | |

The aspherical coefficients are listed below.

| Surface number | 2 | 3 | 13 | 14 |
|---|---|---|---|---|
| Conic constant (K) | 0.00000E+00 | −6.07331E−01 | 0.00000E+00 | 0.00000E+00 |
| Fourth coefficient (A) | 4.00667E−05 | 4.69705E−05 | −2.08627E−05 | −7.93368E−06 |
| Sixth coefficient (B) | −5.13982E−07 | −4.51513E−07 | 7.53415E−08 | 1.26599E−07 |
| Eighth coefficient (C) | 3.32289E−09 | −6.76089E−09 | −2.00515E−09 | −2.67486E−09 |
| Tenth coefficient (B) | −4.53054E−12 | 2.07723E−10 | 1.56133E−11 | 1.88509E−11 |
| Twelfth coefficient (B) | −7.66198E−14 | −2.15824E−12 | −1.09577E−13 | −9.24268E−14 |
| Fourteenth coefficient (B) | 4.46135E−16 | 9.84137E−15 | 4.80053E−16 | 2.90255E−16 |
| Sixteenth coefficient (B) | −7.46570E−19 | −1.57352E−17 | −9.38973E−19 | −4.56563E−19 |

In the present example, Conditional Expression (1) below is satisfied, $$SD12/SD2 < 0.9 \tag{1}$$

where SD12 represents the effective radius of the stop 31, and SD2 represents the effective radius of the second lens L2.

In the present example,
SD12 10.300 mm
SD2 14.535 mm
are satisfied. SD12/SD2=0.709 is therefore achieved.

In the present example, Conditional Expression (2) below is satisfied, $$0.3 < Fg/Fp < 0.8 \tag{2}$$

where Fp represents the focal length of the sixth lens L6 made of plastic, and Fg represents the focal length of the fifth lens L5 made of glass.

In the present example,
Fg 33.896 mm
Fp 55.471 mm
are satisfied. Fg/Fp=0.611 is therefore achieved.

In the present example, Conditional Expression (3) below is satisfied, $$\nu d2 < 45 \tag{3}$$

where νd2 represent the Abbe number of the second lens L2 at the line d.

In the present example, νd2=32.270 is achieved.
In the present example, Conditional Expression (4) below is satisfied, $$0.25 < LTH/L < 0.5 \tag{4}$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 35.295 mm
L 80.050 mm
are satisfied. LTH/L=0.441 is therefore achieved.

In the present example, Conditional Expression (5) below is satisfied, $$0.2 < D12/L < 0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 29.453 mm
L 80.050 mm
are satisfied. D12/L=0.368 is therefore achieved.

In the present example, Conditional Expression (6) below is satisfied, $$F/\varphi ent < 1.6 \quad (6)$$

where F represents the focal length of the overall optical system, and φent represents the diameter of the entrance pupil of the optical system.

In the present example,
F 16.519 mm
φent 11.484 mm
are satisfied. F/φent=1.438 is therefore achieved.

Effects and Advantages

Figure 14:
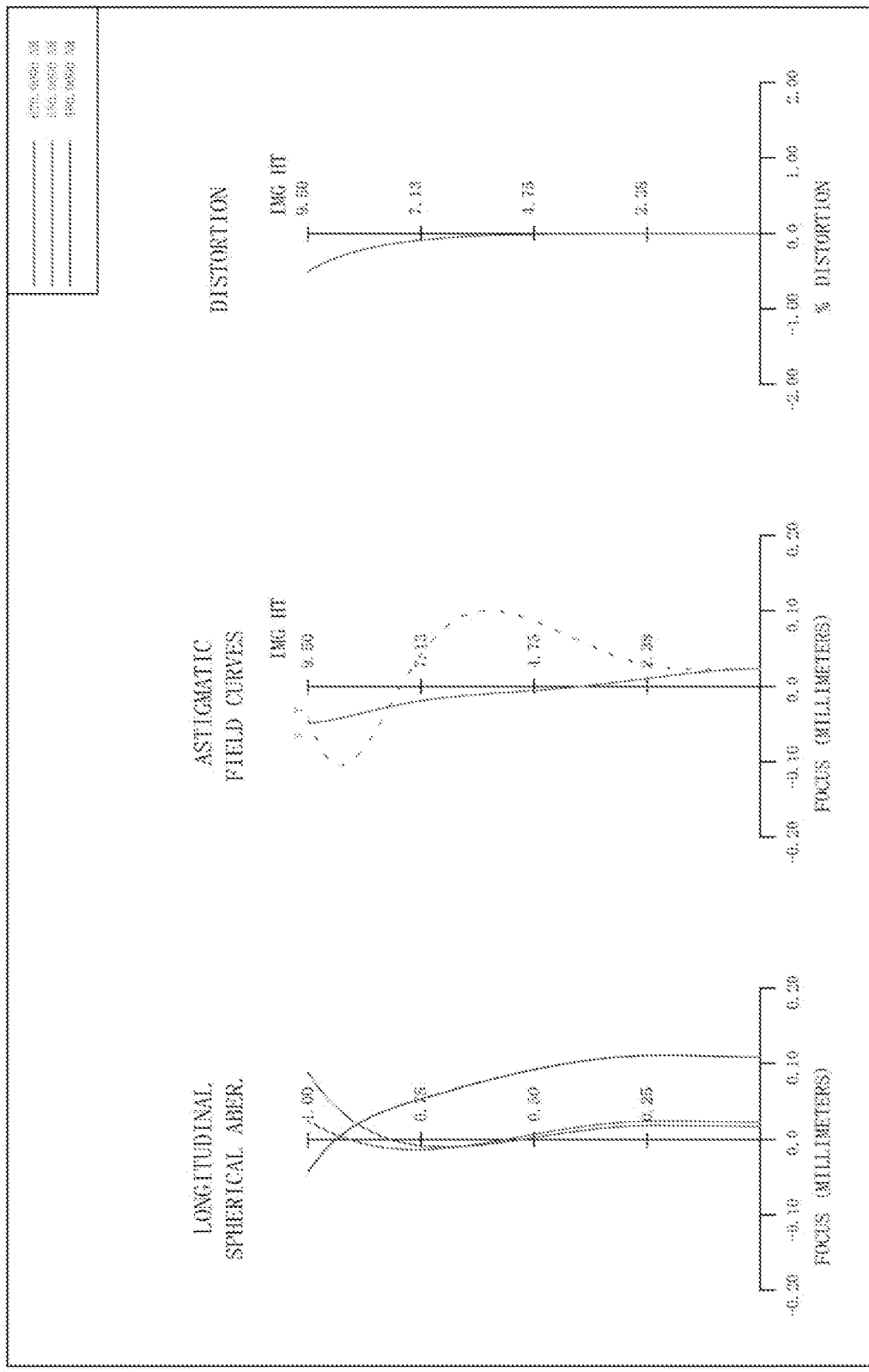
FIG. 14 shows the longitudinal aberration, astigmatism, and distortion in Example 6.

The optical system 3F according to the present example can provide the same effects and advantages as those provided by the optical system 3A according to Example 1. FIG. 14 shows the longitudinal aberration, astigmatism, and distortion of the magnified image produced by the optical system 3F. The optical system 3F according to the present example allows suppression of the variety of types of aberration of the magnified image, as shown in FIG. 14.

Example 7

Figure 15:
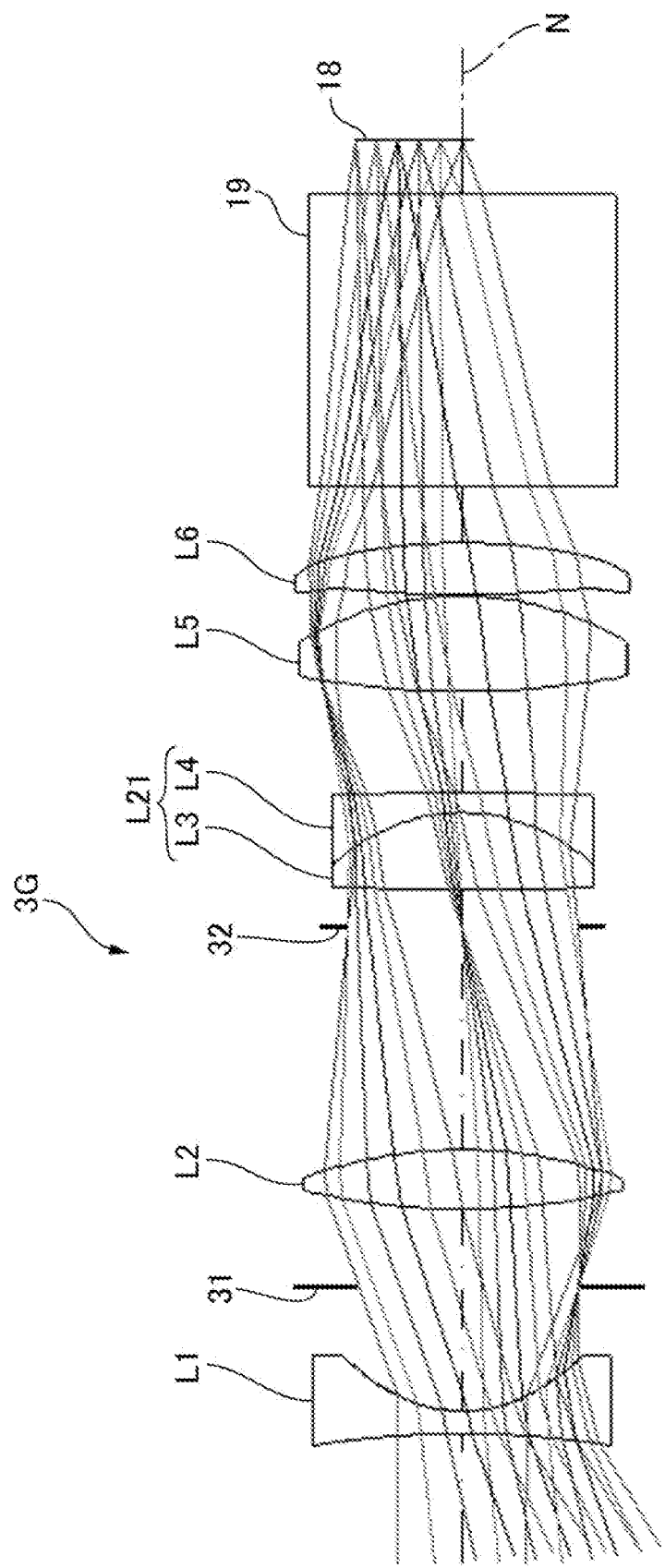
FIG. 15 is a beam diagram showing beams traveling in the optical system according to Example 7.

FIG. 15 is a beam diagram showing beams traveling in an optical system 3G according to Example 7. The optical system 3G includes six lenses, a first lens L1 to a sixth lens L6, as shown in FIG. 15. The first lens L1 to the sixth lens L6 are arranged in this order from the magnifying side toward the demagnifying side.

The first lens L1 has negative power. The first lens L1 has concave surfaces facing the magnifying side and the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has a concave surface facing the magnifying side and a convex surface facing the demagnifying side. The fourth lens L4 has spherical surfaces on opposite sides.

The fifth lens L5 has positive power. The fifth lens L5 has convex surfaces facing the magnifying side and the demagnifying side. The fifth lens L5 has spherical surfaces on opposite sides. The sixth lens L6 has positive power. The sixth lens L6 has convex surfaces facing the magnifying side and the demagnifying side. The sixth lens L6 has aspherical surfaces on opposite sides. The first lens L1 and the sixth lens L6 are made of plastic. The second lens L2, the third lens L3, the fourth lens L4, and the fifth lens L5 are made of glass. The third lens L3 and the fourth lens L4 are bonded to each other into a doublet L21.

The optical system 3G includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3G. The opening diameter of the aperture stop 32 is the opening diameter of the entrance pupil of the optical system 3G.

In the optical system 3G, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3G according to Example 7 are listed below. In the table below, FNo represents the f-number of the optical system 3G, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the fifth lens L5 made of glass, Fp represents the focal length of the sixth lens L6 made of plastic, φent represents the diameter of the entrance pupil, and νd2 represents the Abbe number of the second lens L2 at the line d.

| | |
|---|---|
| FNo | 1.440 |
| TTL | 114.833 mm |
| L | 79.520 mm |
| BF | 35.313 mm |
| LTH | 29.240 mm |
| D12 | 18.006 mm |
| SD12 | 10.300 mm |
| SD2 | 12.968 mm |
| F | 16.557 mm |
| Fg | 40.598 mm |
| Fp | 59.890 mm |
| φent | 11.504 mm |
| νd2 | 44.202 mm |

Data on the lenses of the optical system 3G are listed below. The surfaces of the lenses are numbered sequentially from the magnifying side toward the demagnifying side.

Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character νd represents the Abbe number at the line d. Reference characters R and D are expressed in millimeters.

| Reference character | Surface number | R | D | nd | νd |
|---|---|---|---|---|---|
| S | 0 | infinity | 1770.000 | | |
| | 1 | infinity | 0.000 | | |
| L1 | 2* | −70.50 | 2.000 | 1.5251 | 56.3 |
| | 3* | 12.10 | 11.236 | | |
| 31 | 4 | infinity | 6.770 | | |
| L2 | 5 | 59.87 | 5.301 | 1.7859 | 44.2 |
| | 6 | −40.02 | 19.693 | | |
| 32 | 7 | infinity | 3.528 | | |
| L3 | 8 | 500.00 | 6.784 | 1.4875 | 70.2 |
| L4 | 9 | −16.73 | 2.000 | 1.8467 | 23.8 |
| | 10 | −187.81 | 8.953 | | |
| L5 | 11 | 76.26 | 8.500 | 1.5163 | 64.1 |
| | 12 | −27.94 | 0.100 | | |
| L6 | 13* | 75.72 | 4.655 | 1.5251 | 56.3 |
| | 14* | −52.99 | 5.000 | | |
| | 15 | infinity | 0.000 | | |
| 19 | 16 | infinity | 24.500 | 1.5168 | 64.2 |
| | 17 | infinity | 5.843 | | |
| 18 | 18 | infinity | −0.030 | | |

The aspherical coefficients are listed below.

| Surface number | 2 | 3 | 13 | 14 |
|---|---|---|---|---|
| Conic constant (K) | 0.00000E+00 | −4.14478E−01 | 0.00000E+00 | 0.00000E+00 |
| Fourth coefficient (A) | 4.67946E−05 | 1.92928E−05 | −1.73053E−05 | −6.84077E−06 |
| Sixth coefficient (B) | −6.31374E−07 | −4.48132E−07 | 6.71173E−08 | 1.86294E−07 |
| Eighth coefficient (C) | 3.68872E−09 | −8.94763E−09 | −1.46541E−09 | −2.64110E−09 |
| Tenth coefficient (B) | −3.04954E−12 | 2.12877E−10 | 1.50715E−11 | 1.86590E−11 |
| Twelfth coefficient (B) | −8.57749E−14 | −2.05908E−12 | −1.19267E−13 | −9.57962E−14 |
| Fourteenth coefficient (B) | 4.32472E−16 | 9.32012E−15 | 4.73305E−16 | 2.78992E−16 |
| Sixteenth coefficient (B) | −6.28640E−19 | −1.58058E−17 | −7.88595E−19 | −3.76813E−19 |

In the present example, Conditional Expression (1) below is satisfied, $$SD12/SD2 < 0.9 \quad (1)$$

where SD12 represents the effective radius of the stop 31, and SD2 represents the effective radius of the second lens L2.

In the present example,
SD12 10.300 mm
SD2 12.968 mm
are satisfied. SD12/SD2=0.794 is therefore achieved.

In the present example, Conditional Expression (2) below is satisfied, $$0.3 < Fg/Fp < 0.8 \quad (2)$$

where Fp represents the focal length of the sixth lens L6 made of plastic, and Fg represents the focal length of the fifth lens L5 made of glass.

In the present example,
Fg 40.598 mm
Fp 59.890 mm
are satisfied. Fg/Fp=0.678 is therefore achieved.

In the present example, Conditional Expression (3) below is satisfied, $$\nu d2 < 45 \quad (3)$$

where νd2 represent the Abbe number of the second lens L2 at the line d.

In the present example, νd2=44.202 is achieved.

In the present example, Conditional Expression (4) below is satisfied, $$0.25 < LTH/L < 0.5 \quad (4)$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 29.240 mm
L 79.520 mm
are satisfied. LTH/L=0.368 is therefore achieved.

In the present example, Conditional Expression (5) below is satisfied, $$0.2 < D12/L < 0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 18.006 mm
L 79.520 mm
are satisfied. D12/L=0.226 is therefore achieved.

In the present example, Conditional Expression (6) below is satisfied, $$F/\varphi ent < 1.6 \quad (6)$$

where F represents the focal length of the overall optical system, and φent represents the diameter of the entrance pupil of the optical system.

In the present example,
F 16.557 mm
φent 11.504 mm
are satisfied. F/φent=1.439 is therefore achieved.

Effects and Advantages

Figure 16:
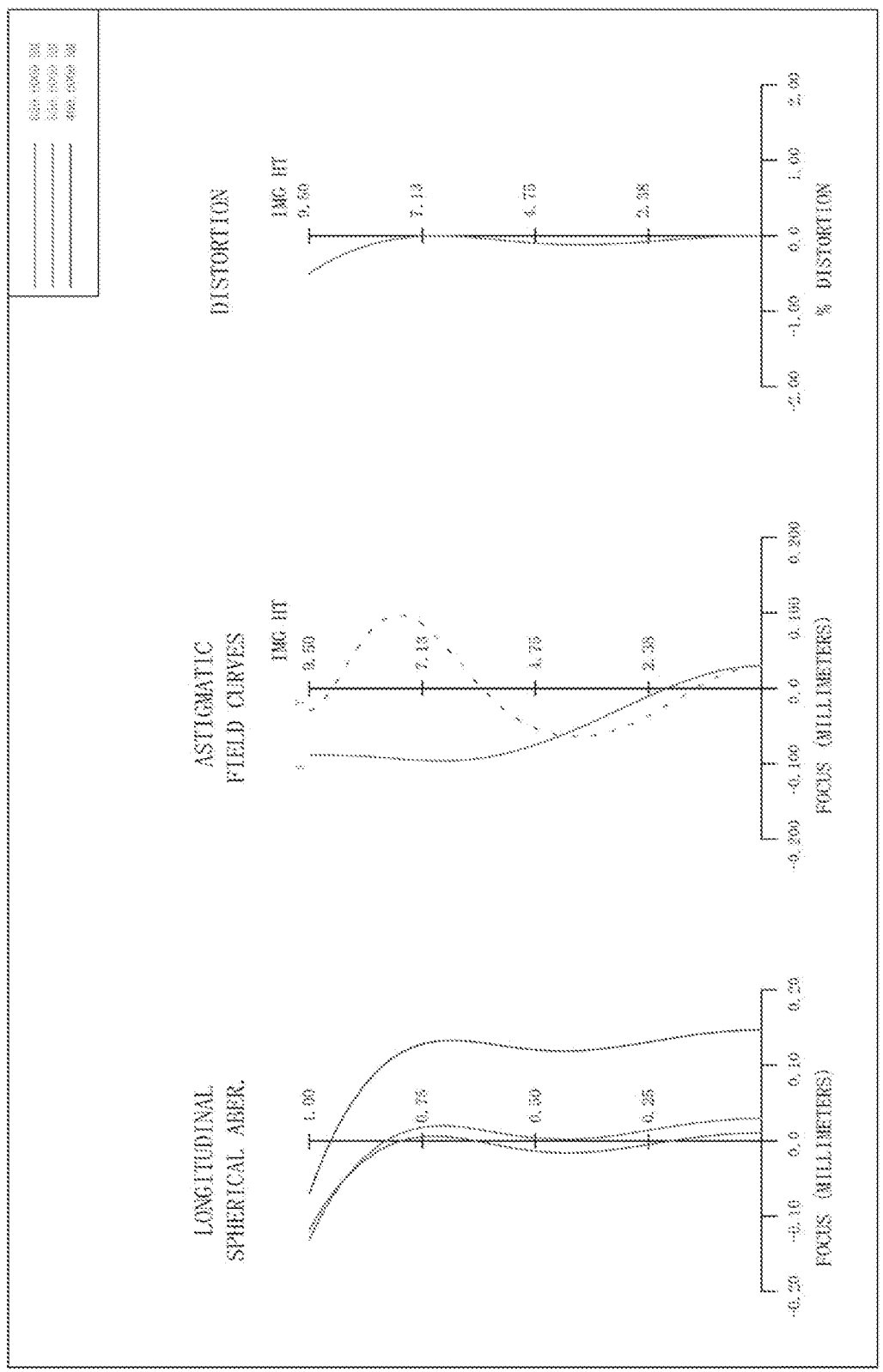
FIG. 16 shows the longitudinal aberration, astigmatism, and distortion in Example 7.

The optical system 3G according to the present example can provide the same effects and advantages as those provided by the optical system 3A according to Example 1. FIG. 16 shows the longitudinal aberration, astigmatism, and distortion of the magnified image produced by the optical system 3G. The optical system 3G according to the present example allows suppression of the variety of types of aberration of the magnified image, as shown in FIG. 16. In Example 7, D12/L in Conditional Expression (5) is close to the lower limit. Due to the fact described above, the aberration diagram in Example 7 shows slight disturbances as compared with the aberration diagrams in the other examples, but the aberrations are corrected in a satisfactory manner as a whole.

Example 8

Figure 17:
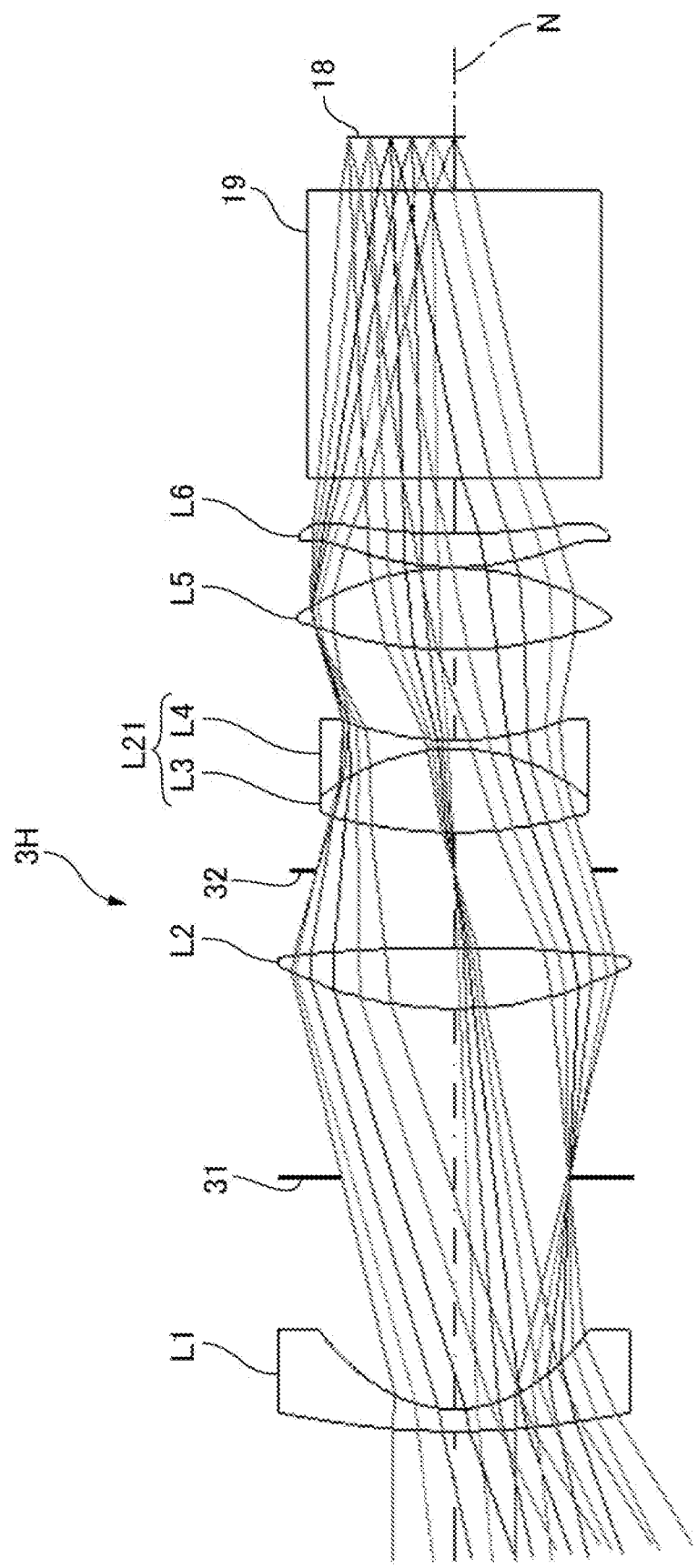
FIG. 17 is a beam diagram showing beams traveling in the optical system according to Example 8.

FIG. 17 is a beam diagram showing beams traveling in an optical system 3H according to Example 8. The optical system 3H includes six lenses, a first lens L1 to a sixth lens L6, as shown in FIG. 17. The first lens L1 to the sixth lens L6 are arranged in this order from the magnifying side toward the demagnifying side.

The first lens L1 has negative power. The first lens L1 has a convex surface facing the magnifying side and a concave surface facing the demagnifying side. The first lens L1 has aspherical surfaces on opposite sides. The second lens L2 has positive power. The second lens L2 has convex surfaces facing the magnifying side and the demagnifying side. The second lens L2 has spherical surfaces on opposite sides. The third lens L3 has positive power. The third lens L3 has convex surfaces facing the magnifying side and the demagnifying side. The third lens L3 has spherical surfaces on opposite sides. The fourth lens L4 has negative power. The fourth lens L4 has concave surfaces facing the magnifying side and the demagnifying side. The fourth lens L4 has spherical surfaces on opposite sides.

The fifth lens L5 has positive power. The fifth lens L5 has convex surfaces facing the magnifying side and the demagnifying side. The fifth lens L5 has spherical surfaces on opposite sides. The sixth lens L6 has positive power. The sixth lens L6 has a convex surface facing the magnifying side and a concave surface facing the demagnifying side. The sixth lens L6 has aspherical surfaces on opposite sides. The first lens L1 and the sixth lens L6 are made of plastic. The second lens L2, the third lens L3, the fourth lens L4, and the fifth lens L5 are made of glass. The third lens L3 and the fourth lens L4 are bonded to each other into a doublet L21.

The optical system 3H includes a stop 31 and an aperture stop 32. The stop 31 is disposed between the first lens L1 and the second lens L2. The stop 31 is a light blocking member provided, for example, in a lens barrel that holds the lenses. The stop 31 blocks a peripheral luminous flux of a luminous flux traveling along the path between the first lens L1 and the second lens L2. The aperture stop 32 is disposed between the second lens L2 and the third lens L3. The aperture stop 32 defines the brightness of the optical system 3H. The opening diameter of the aperture stop 32 is the opening diameter of the entrance pupil of the optical system 3H.

In the optical system 3H, the portion on the demagnifying side of the sixth lens L6 is a telecentric portion. The configuration in which the portion on the demagnifying side of the sixth lens L6 is a telecentric portion means that the central beam of each luminous flux traveling along the path between the sixth lens L6 and the liquid crystal panel 18 disposed in the demagnifying-side conjugate plane is parallel or substantially parallel to the optical axis of the optical system. In the present example, the angle between the central beam of each luminous flux and the optical axis N is smaller than or equal to ±5°.

Data on the optical system 3H according to Example 8 are listed below. In the table below, FNo represents the f-number of the optical system 3H, TTL represents the overall optical length, L represents the distance along the optical axis N from the magnifying-side surface of the first lens L1 to the demagnifying-side surface of the sixth lens L6, BF represents the back focal length (sum of on-axis inter-surface spacings D in segment from surface numbers 14 to 18 described in lens data), LTH represents the sum of the lens thicknesses of the first lens L1, the second lens L2, the third lens L3, the fourth lens L4, the fifth lens L5, and the sixth lens L6 along the optical axis N, D12 represents the on-axis inter-surface spacing between the first lens L1 and the second lens L2, SD12 represents the effective radius of the stop, SD2 represents the effective radius of the second lens L2, F represents the focal length of the overall optical system, Fg represents the focal length of the fifth lens L5 made of glass, Fp represents the focal length of the sixth lens L6 made of plastic, φent represents the diameter of the entrance pupil, and νd2 represents the Abbe number of the second lens L2 at the line d.

| | |
|---|---|
| FNo | 1.500 |
| TTL | 117.221 mm |
| L | 81.391 mm |
| BF | 35.830 mm |
| LTH | 26.417 mm |
| D12 | 36.257 mm |
| SD12 | 10.492 mm |
| SD2 | 14.573 mm |
| F | 16.553 mm |
| Fg | 31.040 mm |
| Fp | 83.461 mm |
| φent | 11.050 mm |
| νd2 | 32.270 mm |

Data on the lenses of the optical system 3H are listed below. The surfaces of the lenses are numbered sequentially from the magnifying side toward the demagnifying side. Reference characters are given to the screen, the lenses, the stop, the aperture stop, the dichroic prism, and the liquid crystal panels. Data labeled with a surface number that does not correspond to any of the screen, the lenses, the stop, the aperture stop, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character vd represents the Abbe number at the line d. Reference characters R and D are expressed in millimeters.

| Reference character | Surface number | R | D | nd | vd |
|---|---|---|---|---|---|
| S | 0 | infinity | 1770.000 | | |
| | 1 | infinity | 0.000 | | |
| L | 2* | 78.04 | 2.000 | 1.5251 | 56.3 |
| | 3* | 11.73 | 20.319 | | |
| 31 | 4 | infinity | 15.937 | | |
| L2 | 5 | 33.96 | 5.529 | 1.8503 | 32.3 |
| | 6 | −140.31 | 6.890 | | |
| 32 | 7 | infinity | 3.528 | | |

-continued

| Reference character | Surface number | R | D | nd | vd |
|---|---|---|---|---|---|
| L3 | 8 | 41.35 | 7.729 | 1.4875 | 70.2 |
| L4 | 9 | −18.55 | 0.800 | 1.8467 | 23.8 |
|  | 10 | 29.10 | 8.199 |  |  |
| L5 | 11 | 39.79 | 7.359 | 1.5163 | 64.1 |
|  | 12 | −25.28 | 0.100 |  |  |
| L6 | 13* | 27.05 | 3.000 | 1.5251 | 56.3 |
|  | 14* | 67.54 | 5.000 |  |  |
|  | 15 | infinity | 0.000 |  |  |
| 19 | 16 | infinity | 26.000 | 1.5168 | 64.2 |
|  | 17 | infinity | 4.839 |  |  |
| 18 | 18 | infinity | −0.009 |  |  |

The aspherical coefficients are listed below.

| Surface number | 2 | 3 | 13 | 14 |
|---|---|---|---|---|
| Conic constant (K) | 0.00000E+00 | −5.84539E−01 | 0.00000E+00 | 0.00000E+00 |
| Fourth coefficient (A) | 3.50352E−05 | 4.59374E−05 | 2.56089E−06 | 1.93006E−05 |
| Sixth coefficient (B) | −5.34007E−07 | −6.38672E−07 | 9.16536E−08 | 1.79293E−07 |
| Eighth coefficient (C) | 3.52977E−09 | −4.46868E−09 | −2.05806E−09 | −3.39174E−09 |
| Tenth coefficient (D) | −3.72690E−12 | 2.07339E−10 | 1.16464E−11 | 1.67273E−11 |
| Twelfth coefficient (E) | −8.11815E−14 | −2.22201E−12 | −1.20755E−13 | −1.02251E−13 |
| Fourteenth coefficient (F) | 4.08512E−16 | 9.78366E−15 | 5.15549E−16 | 2.42490E−16 |
| Sixteenth coefficient (G) | −5.89907E−19 | −1.48197E−17 | −1.19209E−18 | −1.70617E−19 |

In the present example, Conditional Expression (1) below is satisfied, $$SD12/SD2 < 0.9 \quad (1)$$

where SD12 represents the effective radius of the stop 31, and SD2 represents the effective radius of the second lens L2.

In the present example,
SD12 10.492 mm
SD2 14.573 mm
are satisfied. SD12/SD2=0.720 is therefore achieved.

In the present example, Conditional Expression (2) below is satisfied, $$0.3 < Fg/Fp < 0.8 \quad (2)$$

where Fp represents the focal length of the sixth lens L6 made of plastic, and Fg represents the focal length of the fifth lens L5 made of glass.

In the present example,
Fg 31.040 mm
Fp 83.461 mm
are satisfied. Fg/Fp=0.372 is therefore achieved.

In the present example, Conditional Expression (3) below is satisfied, $$vd2 < 45 \quad (3)$$

where vd2 represent the Abbe number of the second lens L2 at the line d.

In the present example, vd2=32.270 is achieved.

In the present example, Conditional Expression (4) below is satisfied, $$0.25 < LTH/L < 0.5 \quad (4)$$

where LTH represents the sum of the lens thicknesses of the first lens L1, the second lens L2, the third lens L3, the fourth lens L4, the fifth lens L5, and the sixth lens L6 along the optical axis N, and L represents the distance along the optical axis N from the magnifying-side surface of the first lens L1 to the demagnifying-side surface of the sixth lens L6.

In the present example,
LTH 26.417 mm
L 81.391 mm
are satisfied. LTH/L=0.325 is therefore achieved.

In the present example, Conditional Expression (5) below is satisfied, $$0.2 < D12/L < 0.5 \quad (5)$$

where D12 represents the on-axis inter-surface spacing between the first lens L1 and the second lens L2, and L represents the distance along the optical axis N from the magnifying-side surface of the first lens L1 to the demagnifying-side surface of the sixth lens L6.

In the present example,
D12 36.257 mm
L 81.391 mm
are satisfied. D12/L=0.445 is therefore achieved.

In the present example, Conditional Expression (6) below is satisfied, $$F/\varphi ent < 1.6 \quad (6)$$

where F represents the focal length of the overall optical system, and φent represents the diameter of the entrance pupil of the optical system.

In the present example,
F 16.553 mm
φent 11.505 mm
are satisfied. F/φent=1.498 is therefore achieved.

Effects and Advantages

Figure 18:
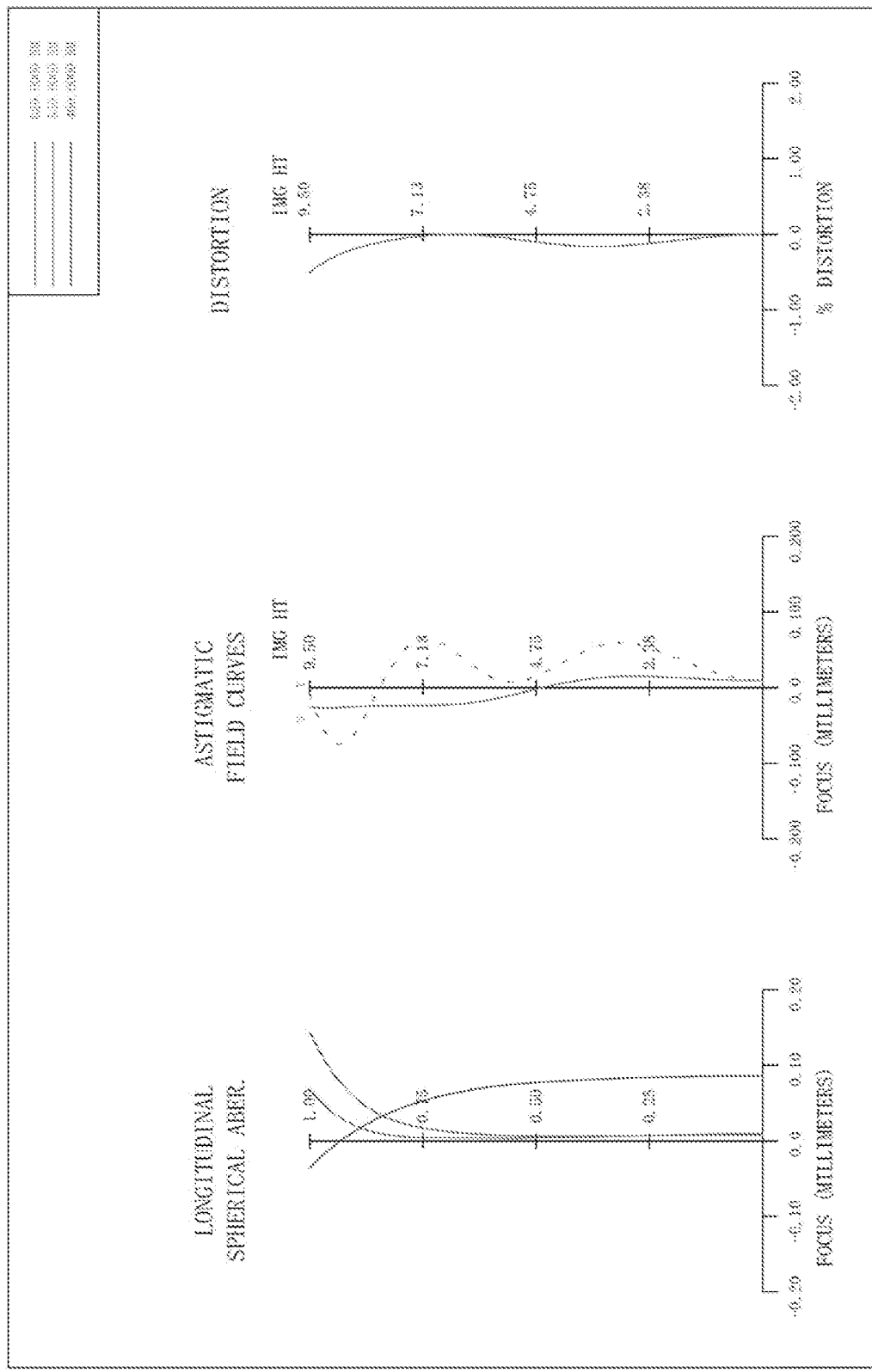
FIG. 18 shows the longitudinal aberration, astigmatism, and distortion in Example 8.

The optical system 3H according to the present example can provide the same effects and advantages as those provided by the optical system 3A according to Example 1. FIG. 18 shows the longitudinal aberration, astigmatism, and distortion of the magnified image produced by the optical system 3H. The optical system 3H according to the present example allows suppression of the variety of types of aberration of the magnified image, as shown in FIG. 18.

Other Embodiments

The optical system according to any of the examples described above can be used as an imaging lens. In this case, an imaging device is disposed in the demagnifying-side conjugate plane of the optical system.

What is claimed is:

1. An optical system comprising:
a first lens having negative refractive power; a stop; a second lens having positive refractive power; an aperture stop; a third lens having positive refractive power; a fourth lens having negative refractive power; a fifth lens having positive refractive power; and a sixth lens having positive refractive power with the first to sixth lenses sequentially arranged from a magnifying side toward a demagnifying side,
wherein the third lens and the fourth lens are bonded to each other into a doublet,
the doublet has negative refractive power,
one of the fifth lens and the sixth lens is made of plastic and has aspherical surfaces on opposite sides, and another of the fifth lens and the sixth lens is made of glass,
a portion on the demagnifying side of the sixth lens is a telecentric portion, and
Conditional Expression (1) below is satisfied, $$SD12/SD2 < 0.9 \tag{1}$$

where SD12 represents an effective radius of the stop, and SD2 represents an effective radius of the second lens.

2. The optical system according to claim 1, wherein the first lens is made of plastic and has aspherical surfaces on opposite sides.

3. The optical system according to claim 1, wherein the third lens and the fourth lens is made of glass.

4. The optical system according to claim 1, wherein Conditional Expression (2) below is satisfied, $$0.3 < Fg/Fp < 0.8 \tag{2}$$

where Fp represents a focal length of one selected from the fifth lens and the sixth lens and made of plastic, and Fg represents a focal length of another one selected from the fifth lens and made of glass.

5. The optical system according to claim 1, wherein Conditional Expression (3) below is satisfied, $$vd2 < 45 \tag{3}$$

where vd2 represents an Abbe number of the second lens at a line d.

6. The optical system according to claim 1, wherein Conditional Expression (4) below is satisfied, $$0.25 < LTH/L < 0.5 \tag{4}$$

where LTH represents a sum of lens thicknesses of the first lens, the second lens, the third lens, the fourth lens, the fifth lens, and the sixth lens along an optical axis of the optical system, and L represents a distance along the optical axis from a magnifying-side surface of the first lens to a demagnifying-side surface of the sixth lens.

7. The optical system according to claim 1, wherein Conditional Expression (5) below is satisfied, $$0.2 < D12/L < 0.5 \tag{5}$$

where D12 represents on a distance along the optical axis inter-surface spacing between the first lens and the second lens, and L represents a distance from a magnifying-side surface of the first lens to a demagnifying-side surface of the sixth lens.

8. The optical system according to claim 1, wherein Conditional Expression (6) below is satisfied, $$F/\varphi ent < 1.6 \tag{6}$$

where F represents a focal length of the overall optical system, and φent represents a diameter of an entrance pupil.

9. A projector comprising:
the optical system according to claim 1; and
an image formation unit that forms a projection image in a demagnifying-side conjugate plane of the optical system.

* * * * *